US006574329B2

(12) United States Patent
Takeuchi et al.

(10) Patent No.: US 6,574,329 B2
(45) Date of Patent: Jun. 3, 2003

(54) INCOMING CALL PROCESSING METHOD, INCOMING CALL PROCESSING APPARATUS, AND COMPUTER-READABLE RECORDING MEDIUM HAVING AN INCOMING CALL PROCESSING PROGRAM RECORDED THEREON

(75) Inventors: Tatsuyuki Takeuchi, Fukuoka (JP); Masataka Mukaihara, Fukuoka (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/286,726

(22) Filed: Apr. 6, 1999

(65) Prior Publication Data

US 2002/0101977 A1 Aug. 1, 2002

(30) Foreign Application Priority Data

Jul. 22, 1998 (JP) .......................................... 10-207002

(51) Int. Cl.$^7$ .......................... H04M 5/00; H04M 3/42; H04M 1/64; H04M 11/06; H04J 15/00
(52) U.S. Cl. ..................... 379/242; 379/207.03; 379/84; 379/88.09; 379/67.1; 379/205.01; 370/58.2; 370/60
(58) Field of Search .......................... 379/242, 84, 207, 379/88.09, 67.1, 205.01; 370/58.2, 60

(56) References Cited

U.S. PATENT DOCUMENTS

| 4,764,919 A | * | 8/1988 | Hunter et al. .................. 370/60 |
| 4,788,715 A | * | 11/1988 | Lee .............................. 379/84 |
| 5,185,782 A | * | 2/1993 | Srinivasan .................. 379/67.1 |
| 5,291,552 A | * | 3/1994 | Kerrigan et al. ......... 379/266.1 |
| 5,299,259 A | * | 3/1994 | Otto ....................... 379/221.01 |
| 5,691,973 A | * | 11/1997 | Ramstrom et al. .......... 370/58.2 |
| 5,692,033 A | * | 11/1997 | Farris ........................ 379/67.1 |
| RE36,416 E | * | 11/1999 | Szlam et al. ............. 379/88.09 |
| 6,035,027 A | * | 3/2000 | Alleman ................ 379/205.01 |
| 6,088,436 A | * | 7/2000 | Mashinsky .................. 379/207 |

FOREIGN PATENT DOCUMENTS

| JP | 3-212053 | 9/1991 |
| JP | 3-277096 | 12/1991 |
| JP | 7-7555 | 1/1995 |

* cited by examiner

Primary Examiner—Harry S. Hong
Assistant Examiner—Thjuan P Knowlin
(74) Attorney, Agent, or Firm—Katten Muchin Zavis Rosenman

(57) ABSTRACT

The present invention relates to an incoming call processing method for enabling immediate answering of the greatest possible number of incoming calls without generating unserviced phone calls, by determining whether to answer the incoming call immediately or to answer the incoming call at a later time at which the volume of incoming call traffic intensity is light. To this end, the method includes a call receiving step for causing an electronic exchanger to receive an incoming call, an incoming call acceptance step for determining whether to answer the incoming call received in the call receiving step immediately or to answer the incoming call at a later time at which the volume of incoming call traffic intensity is light, and an answer step for answering the incoming call according to the type of answer determined by the incoming call acceptance step.

12 Claims, 30 Drawing Sheets

FIG.4(a)

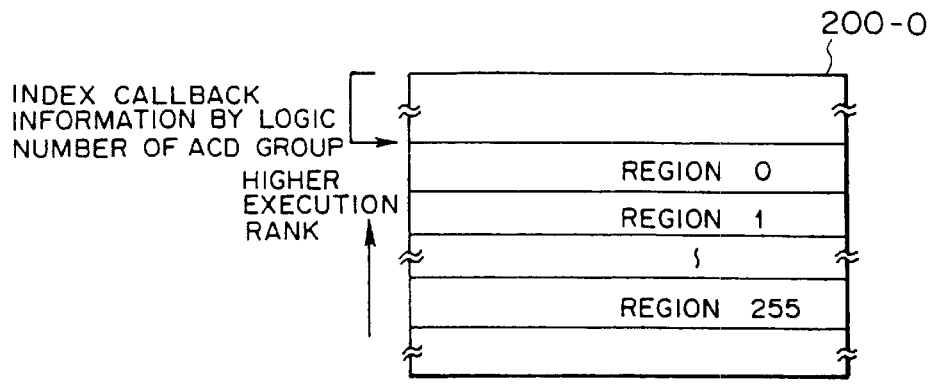

TYPE: CALLBACK EXECUTION CONDITION
  LOGICAL VALUE OF 0 = NO CALLBACK
  OR
  LOGICAL VALUE OF 1 = CALLBACK WHEN MEAN WAITING TIME EXCEEDS THRESHOLD VALUE
  OR
  LOGICAL VALUE OF 2 = CALLBACK ACCORDING TO INPUTTED REQUIREMENT
  OR
  LOGICAL VALUE OF 3 = CALLBACK ACCORDING TO CALLING PARTY INFORMATION
  OR
  LOGICAL VALUE OF 255 = CALLBACK ACCORDING TO THE PHONE NUMBER OF THE OPERATOR TERMINAL

FIG.4(b)

CALLBACK CONDITION REGISTRATION
TABLE 200-0 AT TYPE 1

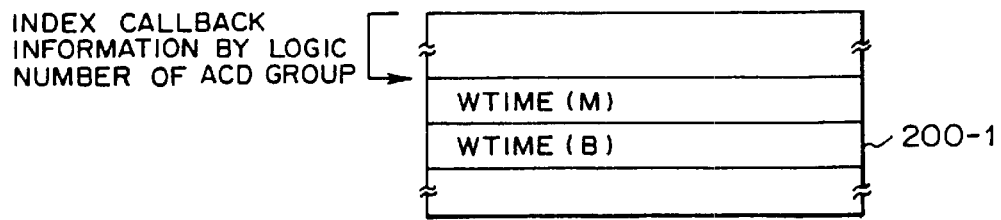

WTIME (M) : WAITING TIME THRESHOLD VALUE (min.)(0~255)
WTIME (B) : WAITING TIME THRESHOLD VALUE (sec.)(0~255)

CALLBACK CONDITION REGISTRATION TABLE 200-0 AT TYPE 2

ANMID : LOGICAL VALUE OF ANNOUNCEMENT OFFERED TO URGE THE CLIENT TO INPUT REQUIREMENTS
CALLBK : OPERATIONS CORRESPONDING TO NUMBERS SELECTED BY THE CLIENT
    0 : CALLBACK IS TO BE MADE
    1 : CALL IS TO BE QUEUED

CALLBACK CONDITION REGISTRATION TABLE 200-0 AT TYPE 3

BIP(n) : PHONE NUMBER OF CLIENT WHO IS NOT ALLOWED TO CALL BACK

CALLBACK CONDITION REGISTRATION TABLE 200-0 AT TYPE 255

UKETUKE(1): RECEIPT NUMBER OF INCOMING CALL WHICH IS NOT ALLOWED TO CALL BACK

CDN: CALLBACK DIAL NUMBER
CTIME: DESIRED CALLBACK TIME

OBJFLG: OBJECT-OF-OPERATION FLAG
LOGICAL VALUE OF 0 = INACTIVE
LOGICAL VALUE OF 1 = ACTIVE

PREDICT: PREDICTED TRAFFIC INTENSITY
ALLOW : ACCEPTABLE TRAFFIC INTENSITY

INCOMING CALL PROCESSING METHOD, INCOMING CALL PROCESSING APPARATUS, AND COMPUTER-READABLE RECORDING MEDIUM HAVING AN INCOMING CALL PROCESSING PROGRAM RECORDED THEREON

BACKGROUND OF THE INVENTION

1) Field of the Invention

The present invention relates to an incoming call processing method, an incoming call processing apparatus, and a computer-readable recording medium having an incoming call processing program recorded thereon.

2) Description of the Related Art

In the field of telephone reception tasks which involve reception of a large number of incoming calls, such as complaints from clients, or a telemarketing operation, there is often introduced automatic call distribution service (hereinafter referred to as "ACD service") in which an electronic exchanger automatically distributes incoming calls to individual operator terminals in order to efficiently receive the incoming calls.

In the ACD service, ACD groups, each group comprising a plurality of operator terminals, are divided according to tasks. A single ACD group usually constitutes a single unit, and receive-only operators of individual operator terminals answer incoming calls one after another. Since a limited number of operator terminals are available for the ACD service, a large number of incoming calls are efficiently received by equalization of loads exerted on the respective operator terminals and by efficiently bringing the operator terminals in operation.

In the ACD service, incoming calls are in principle received according to a queuing (or FIFO: first-in-first-out) scheme. If all the limited number of operator terminals are busy in answering incoming calls, the calling parties are required to wait while hearing announcements until they are serviced by available operator terminals.

The ACD service is based on the premise that the calling parties have to wait in order to realize efficient receipt of calls. Although the telephone operators can receive calls efficiently, the calling parties must frequently wait for answers and are apt to feel frustrated. In some cases, the calling parties complain that they must wait for a very long period of time until they are finally serviced by the telephone operators.

Depending on the type and form of tasks, the number of calls the ACD service receive usually varies from one time to another. FIG. 31 shows the relationship between variations in the number of incoming calls and the number of calls answered by operators in the ACD service. FIG. 31 shows the result of simulation of the operator terminals answering incoming calls provided in an "incoming call" section.

First, numerals entered in individual columns in FIG. 31 will be described.

The horizontal axis of the table shows time T. For the sake of simplicity, time T is divided into time segments ranging from 0 through 40 and corresponds to service hours during which calls are serviced. Numerals provided in the "Incoming call" section, which is denoted by reference code (a) in FIG. 31, each represent incoming calls (calls from clients) at each segment of time T. For instance, calls 1 and 2 are received at time T=1, and calls 3, 4, and 5 are received at time T=2.

Numerals provided in a "Queued call" section, which is denoted by reference code (b) in FIG. 31, represent incoming calls which are queued because no operator terminals are available to answer them. These incoming calls are placed in a waiting status until an operator terminal becomes able to answer. For example, call 14 which is received at time T=4 is queued and as a result is waiting in the queue. During the wait, the calling party of call 14 hears a ringing tone or announcements offered by the ACD service.

The queue fulfils a queuing scheme, and a value or pointer is stored in order of arrival and calls are serviced in the sequence of value or point. In short, an early-arriving call is not serviced at a later or earlier time but is inevitably serviced according to sequence of arrival.

For the sake of explanation, a call that is waiting in the queue of telephone calls will be hereinafter often referred to as a "queued call." The queued call corresponds to one of calls stored in a callback queue in sequential order and has the function of making a request for an ACD system to make a callback at a callback time by way of any of the operator terminals. Because of such a function, the queued call declares a callback to the ACD system at a callback time by setting an appointment flag.

Numerals provided in a "Operator terminals A through G" section, which is denoted by reference code (c) in FIG. 31, represent that the individual operators are receiving incoming calls. In this case, seven operators (from A to G) are receiving telephone calls. For example, from time T1 to time T3, the operator A is talking with the calling party of call 1. From time T6 to T8, the operator G is talking with the calling party of call 14. Further, from time T17 to T19, the operator C is idle (inactive).

Numerals provided in a "Call immediately serviced by the operator" section, which is denoted by reference symbol (d) in FIG. 31, represent calls which are received at respective points in time and are immediately answered by respective operators, who immediately start talking with the respective callers. For instance, at time T=1, the operator A immediately starts talking with the calling party of the call 1, and the operator B immediately starts talking with the calling party of the call 2.

Numerals provided in a "call serviced by the operator terminal after a wait" section, which is denoted by reference code (e) in FIG. 31, represent calls which have been waiting in the queue and are answered at respective times by operators, who then start talking with the respective calling parties. For instance, at time T=4 calls 8 and 9, which have been waiting, are answered by the operators A and B, respectively, who then start talking with the respective calling parties.

Finally, numerals provided in a "Call unserviced and aborted (disconnected by the calling parties)" section, which is denoted by reference code (f) in FIG. 31, represent calls which are aborted by the calling parties because of a long waiting time and cannot be serviced by the operators.

For the sake of simplicity, the following model applies to the simulation.

Upon occurrence of an incoming call, if any operator can answer, the operator talks with the calling party of the call. The duration of a call corresponds to three time segments of time T. For instance, when call 1 is received at time T1, the operator A can answer (or is idle). Therefore, the operator A answers the call 1. Here, "the operator A talking with the calling party of the call" is represented by entering number 1 in a block defined by the column of time T1 and the row of the operator A in the section "Operator terminals A through G." Further, the calling party of the call 1 is talking with the operator A during a time period from T1 to T3. The "duration of the call 1" is indicated by number 1 entered in the blocks defined by columns of time T1 to T3 and the row of the operator A in the section "Operator terminals A to G."

If no operator is able to answer (i.e., no operator is available) at the time of arrival of an incoming call, i.e., if the blocks defined by the column of a certain time segment and the rows of operator terminals A through G are already filled in, the incoming call is queued. For example, when call is connected at time T4, there is no available operator table; hence, the call 15 is queued. This is represented by numeral 15 entered in the column of time T4 in the "Queued call" section. Numerals representing calls are continuously written in the column of corresponding time in the "Queued call" section until one of the operators answers the call.

When the queued call is waiting for the time corresponding to three time segments T, the call is aborted (or disconnected by the calling party) at a subsequent time, thereby rendering the call unserviced. For example, the previously-described call 15 is waiting in the queue of telephone calls from time T4 to T6 and is disconnected (or aborted) at time T7 by the calling party. This is represented by numeral 15 entered in columns of time T4 to T6 in the "Queued call" section and then numeral 15 entered into a column of time T7 in the "Call unserviced and aborted (or disconnected by the calling party)" section.

The results of simulation of the operators answering the incoming calls provided in the "Incoming call" column according to the foregoing model revealed the following items (1-1) to (1-3).

(1-1) As pointed out by the numerals provided in the "Call aborted (disconnected by the calling party" section, twenty-one calls are disconnected before being serviced by the operators; namely, call 15, calls 18 through 22, calls 26 through 28, calls 31 through 33, calls 36 and 37, calls 68 through 70, calls 72 through 74, and call 77. The thus-aborted calls account for about 26% of all incoming calls (82 calls). More specifically, the operators failed to generate a profit which would otherwise have been generated by the twenty-one calls.

(1-2) As pointed out by the numerals provided in the "Call serviced by the operator after a wait" section, thirty-nine calls, which account for about 48% of all incoming calls (82 calls) are serviced by the operators after a wait.

(1-3) As pointed out by the numerals provided in the "Call immediately serviced by the operator" section, twenty-two calls, which account for about 26% of all the incoming calls (82 calls), are immediately serviced by the operators.

As shown in FIG. 31, the ACD service is apt to create two major dissatisfactions among calling parties; that is, the calling party must wait until he is serviced, and the time period during which the calling party is required to wait is long.

To solve the problems of the foregoing ACD service, there has been proposed a technique entitled "Automatic Callback Method and System for Automatic Call Distribution Service" disclosed in Japanese Patent Application Laid-open No. HEI-7-7555. The details of this technique are as follows:

When no operator terminal is available and the time that has elapsed before any of the operators terminals becomes able to answer exceeds a certain threshold value, the telephone number of the calling party is recorded and the call is temporarily disconnected. When one of the operator terminals become able to answer at a later time, the operator calls the calling party back. As a result of the calling party being connected to the operator who can answer, the call from the calling party is serviced by one of the plurality of operator terminals.

Under this method, an initial decision is made as to which one of the plurality of ACD service operator terminals can answer. If it is decided that no operator terminals are available, the telephone number of the calling party (hereinafter often referred to as a "calling party's number") is queued, and the call is disconnected. When one of the operator terminals becomes able to answer, the calling party is called back through use of the calling party's number by means of the ACD service, thereby connecting the calling party to the operator terminal that can answer.

Figure 32:
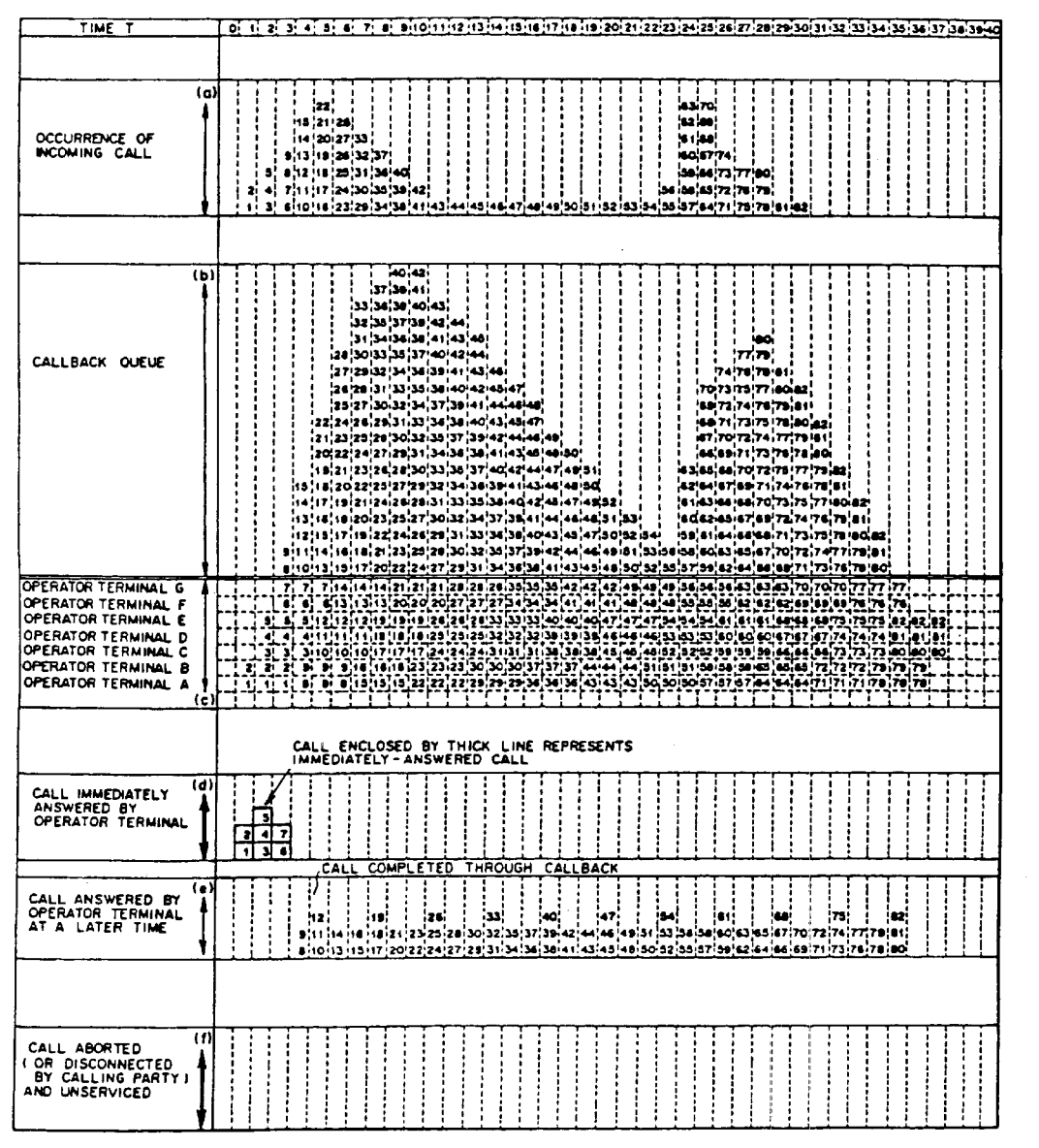

FIG. 32 shows a model regarding the relationship between incoming calls and answering by the operators in the ACD service disclosed in Japanese Patent Application Laid-open No. HEI-7-7555. The relationship provided in FIG. 32 corresponds to the result of simulation of application of the technique disclosed in the patent publication to a situation in which incoming calls provided in the "Incoming call" section are serviced by the operators.

Numerals entered in the columns in FIG. 32 will now be described.

The horizontal axis of the table shows time T. Time T is divided into time segments ranging from 0 through 40 and corresponds to service hours during which calls are serviced.

Numerals provided in the "Incoming call" section each represent incoming calls (calls from clients) at each segment of time T.

Numerals provided in a "Queued call" section represent incoming calls which are temporarily disconnected because no operator terminals can answer them. These calls are queued as information for callback purpose and are waiting in a callback queue until they are called back when one of the operators finishes talking and becomes able to answer. For example, call 14 which is received at time T=4 is temporarily disconnected and is queued and waiting in the queue from time T4 to time T5. During the wait, the calling party of the call 14 hangs up the telephone and is awaiting a call from an operator. In short, while the calling party is awaiting a callback, the telephone line is out of use.

Numerals provided in a "Operator terminals A through G" section represent that the individual operators are receiving incoming calls indicated by numerals (in this case, seven operators from A to G are receiving telephone calls). For example, from time T1 to time T3, the operator A is talking with the calling party of the call 1. From time T6 to T8, the operator G calls back and talks with the calling party of call 14.

Numerals provided in a "Call immediately serviced by the operator" section represent calls which are received at a time period and are immediately answered by operators, who immediately start talking with the respective calling parties.

Numerals provided in a "Call answered to a callback from the operator terminal" section represent that at respective times, the operators call back and start talking with the calling parties who have been waiting for callbacks. For instance, the operators A and B call back and start talking with the calling parties of calls 8 and 9, respectively, who have been waiting.

Numerals provided in a "Call unserviced and aborted (disconnected by the calling parties)" section represent calls which are aborted by the calling parties because of a long waiting time and cannot be serviced by the operators.

For the sake of simplicity, the following model applies to the simulation, as in the case with the simulation shown in FIG. 31.

Upon occurrence of an incoming call, if any operator can answer, the same processing as that performed in the simulation shown in FIG. 31 will be performed.

In contrast, if no operator is able to answer (i.e., the blocks defined by the column of a certain time segment and the rows of operator terminals A through G are already filled in), the incoming call is temporarily disconnected to thereby release the telephone line. The incoming call is then queued.

For example, when call 15 is connected at time T4, no operator is available; hence, the call 15 is temporarily disconnected. Information regarding a callback to the calling party of the call 15 is placed in a callback queue. This is represented by numeral 15 entered in the column of time T4 in the "Queued call" section. Numerals representing calls are continuously written into the column of time segments in the "Queued call" section until one of the operators answers the call.

In effect, the call placed in the callback queue is not waiting while being connected to the ACD service over the telephone line; rather, the calling party of the call is waiting for a callback from the operator. Therefore, even when the call is queued for a long period of time, the calling party is regarded to not have aborted the call.

When one of the operators becomes able to answer, the calling party who is waiting is called back according to the callback information placed in the callback queue, thereby establishing communication between the operator and the calling party. For instance, the "Operator terminals A through G" section shown in FIG. 32 shows that at time T7 the operator A calls back the calling party of the call 15, which had been received at time T4.

The results of simulation of the operator answering the incoming call provided in the "Incoming call" column according to the foregoing model reveal the following items (2-1) to (2-3).

(2-1) As shown in the "Call unserviced and aborted (disconnected by the calling party)" section, no calls are aborted and unserviced. In other words, all the incoming calls can be serviced.

(2-2) As pointed out by the numerals provided in the "Call answered to a callback from the operator" section, seventy-five calls, which account for about 91% of all incoming calls (82 calls) are serviced by the operators after a wait, by means of callbacks from the operators.

(2-3) As pointed out by the numerals provided in the "Call immediately serviced by the operator" section, only seven calls, which account for about 9% of all incoming calls (82 calls), are immediately serviced by the operators.

From the simulation result shown in FIG. 32, it is understood that the ACD system to which the technique described in Japanese Patent Application Laid-open No. HEI-7-7555 is applied eliminates unserviced calls but results in a very low number of calls being answered immediately.

As mentioned previously, the incoming call processing method represented by the ACD service is based on the assumption that calling parties must wait in order that a limited number of operators can efficiently service a large number of incoming calls. For this reason, the calling parties disconnect their calls, thus resulting in a large number of unserviced calls. Consequently, companies which receive orders by means of receipt of incoming calls will fail to win a contract or will lose profits, and they will also lose their credibility in the eyes of calling parties (or clients) by failing to receive complaints therefrom.

Further, the ACD system to which the technique described in Japanese Patent Application Laid-open No. HEI-7-7555 is applied eliminates unserviced calls by fulfilling the needs of called parties through use of callbacks. However, there still remains an unsolved problem; namely, the number of calls immediately serviced is drastically reduced, which in turn increases the number of calling parties who are dissatisfied with the length of a wait before they are serviced.

SUMMARY OF THE INVENTION

The present invention has been conceived in view of the foregoing problems of the related art, and the object of the present invention is to provide an incoming call processing method, an incoming call processing apparatus, and a computer-readable recording medium having an incoming call processing program recorded thereon, wherein the greatest possible number of incoming calls can be serviced immediately without involving unserviced telephone calls by selection of whether to answer an incoming call immediately or to answer a calling party (or a client) at a later time at which the volume of incoming traffic intensity is light.

To this end, the present invention provides an incoming call processing method comprising:

a call receiving step for causing an electronic exchanger to receive an incoming call;

an incoming call acceptance step for determining whether to answer the incoming call immediately or to answer the incoming call at a later time at which the volume of incoming traffic intensity is light; and an answer step for answering the incoming call according to the type of answer determined in the incoming call acceptance step.

By use of such a method, the greatest possible number of incoming calls can be answered immediately without involving unserviced telephone calls, thereby expanding opportunities for operators to establish communication with clients. Further, operators can be arranged correctly, thus resulting in effective utilization of a telephone line and a reduction in operating costs.

Preferably, the incoming call processing method further comprises a time information selection-and-determination step for selecting and determining information about the time at which an operator can answer the incoming call that in the coming call acceptance step is selected to be answered at a later time;

a first notification step for reporting to a calling party the time information selected and determined in the time information selection-and-determination step;

a verification step for verifying an approval of the calling party regarding the time information report made in the first notification step; and an answer time determination step for determining as answer time information the time information approved by the calling party in the verification step.

Preferably, the incoming call processing method further comprises an operator terminal selection step for selecting an operator terminal which is to answer, at the answer time determined in the response time determination step, the incoming call, which in the incoming call acceptance step has been selected to be answered at a later time; and an operator terminal reserve step for reserving for answering the incoming call the operator terminal selected in the operator terminal selection step.

The methods yield an advantage of elimination of dissatisfaction among the calling parties required to wait for answers by the operators. For example, when the operator arranges to answer the calling party through use of a callback, the calling party is excused from having to wait by the telephone. Further, the methods yield another advantage of the operator being able to perform operations efficiently by controlling the time to call the client back. Moreover, the operator can inevitably answer the calling party at a designated time without deteriorating the availability factor of the operator terminals, thereby improving credibility in the eyes of the calling parties.

Preferably, the time information selection-and-determination step may be a step for selecting and determining the time at which the operator can answer the incoming call selected in the incoming call acceptance step to be answered at a later time. Alternatively, the time information selection-and-determination step may be configured as a step for selecting and determining a time period in which the operator can answer the incoming call selected in the incoming call acceptance step to be answered at a later time. Further, an answer time designation step may be provided after the first notification step. In this step, the calling party designates a desired time within the answer time period determined in the time information selection-and-determination step. Further, the verification step may be a step for verifying the time designated in the answer time designation step.

These steps yield an advantage of spreading calls over the time at which the volume of incoming call traffic intensity is light, thus improving answering efficiency. Further, the steps yield an advantage of enabling the calling party to select a desired answer time. Since the client's desire is taken into consideration, the quality of the service is improved.

Preferably, the incoming call processing method according to the present invention may further comprises an answer postponement information cancellation step for canceling the postponement information on condition that the operator terminal can answer and finish talking if the same calling party initiates an incoming call before the operator answers the incoming call that has been selected in the incoming call acceptance step to be answered at a later time.

As a result, elimination of wasteful answering connection becomes feasible, thereby improving the availability factor of the operator terminals and the use efficiency of the telephone line.

Further, the incoming call processing method according to the present invention may further comprise a second notification step for informing the calling party that no operator terminal can answer if the same calling party initiates an incoming call in the answer step before the operator answers the incoming call, which in the incoming call acceptance step has been selected to be answered at a later time. Preferably, the incoming call processing method further comprises an answer time change step for changing the answer time, which has been determined in the answer time determination step, in association with the reporting operation in the second notification step.

By means of these steps, an incoming call can be appropriately connected to and answered by the operator terminal whenever necessary, and client requests for a change can be satisfied.

The present invention also provides an incoming call processing apparatus comprising:

predicted traffic intensity information storage means for storing predicted traffic intensity information about an incoming call received by an electronic exchanger;

incoming call acceptance means for determining whether to answer the incoming call immediately or to answer the incoming call at a later time at which the volume of incoming traffic intensity is light;

time information selection-and-determination means for selecting and determining information about the time at which the operator can answer the incoming call that has been selected by the incoming call acceptance means to be answered at a later time, on the basis of the predicted traffic intensity information stored in the predicted traffic intensity information storage means;

first notification means for reporting to a calling party the time information selected and determined by the time information selection-and-determination means;

verification means for verifying an approval of the calling party regarding the time information report made by the first notification means;

answer time storage means for determining and storing as answer time information the time information that is approved by the calling party by way of the verification means; and answer means which immediately answers the incoming call if the incoming call acceptance means has determined that the incoming call is to be answered immediately and which answers the incoming call at the time stored in the answer time storage means if the incoming call acceptance means has determined that the incoming call is to be answered at a later time.

By employment of such an apparatus, the greatest possible number of incoming calls can be answered immediately without involving unserviced telephone calls, thereby expanding opportunities for operators to establish communication with clients. Further, operators can be arranged correctly, thus resulting in effective utilization of a telephone line and a reduction in operating costs.

Preferably, the incoming call processing apparatus according to the present invention further comprises operator terminal selection means for selecting an operator terminal which is to answer the incoming call, which has been selected by the incoming call acceptance means to be answered at a later time, at the answer time determined by the incoming call acceptance means; and operator terminal reservation means for reserving the operator terminal selected by the operator terminal selection means for answering the incoming call.

With the foregoing means, the incoming call can be inevitably answered at a designated time without deteriorating the availability factor of the operator terminal, thereby improving credibility in the eyes of the calling parties.

Preferably, the incoming call processing apparatus further comprises answer postponement information cancellation means for canceling the postponement information on condition that the operator terminal can answer and finish talking if the same calling party initiates another incoming call before the operator answers the incoming call that has been selected by the incoming call acceptance means to be answered at a later time;

second notification means for informing the calling party that no operator terminal can answer if the same calling party initiates an incoming call before the operator answers the incoming call, which has been selected by the incoming call acceptance means to be answered at a later time; and answer time change means capable of changing the answer time, which has been determined by the answer time determination means, in association with the reporting operation of the second notification means.

As a result, an incoming call can be appropriately connected to and answered by the operator terminal whenever necessary, and the client requests for change can be satisfied.

The present invention also provides a computer-readable recording medium on which there is recorded an incoming call processing program for causing a computer to act as call receiving means for causing an electronic exchanger to receive an incoming call;

incoming call acceptance means for determining whether to answer the incoming call received by the call receiving means immediately or to answer the incoming call at a later time at which the volume of incoming traffic intensity is light; and answer means for answering the incoming call according to the type of answer determined by the incoming call acceptance means.

The recording medium enables efficient management of client data including the incoming call processing method and incoming traffic intensity data, prediction of future waiting time of the client, and long-range analysis of the data.

BRIEF DESCRIPTION OF THE DRAWINGS

FIG. 4(a) is an illustration for describing one embodiment of setting of a callback condition under which a calling party is answered by means of a callback;

FIG. 4(b) is an illustration for describing one embodiment of setting of a mean waiting time on condition that a calling party is called back;

FIG. 30 is a model chart showing the relationship between incoming calls and answering by an operator terminal in an ACD service to which the present invention is applied;

Figure 31:
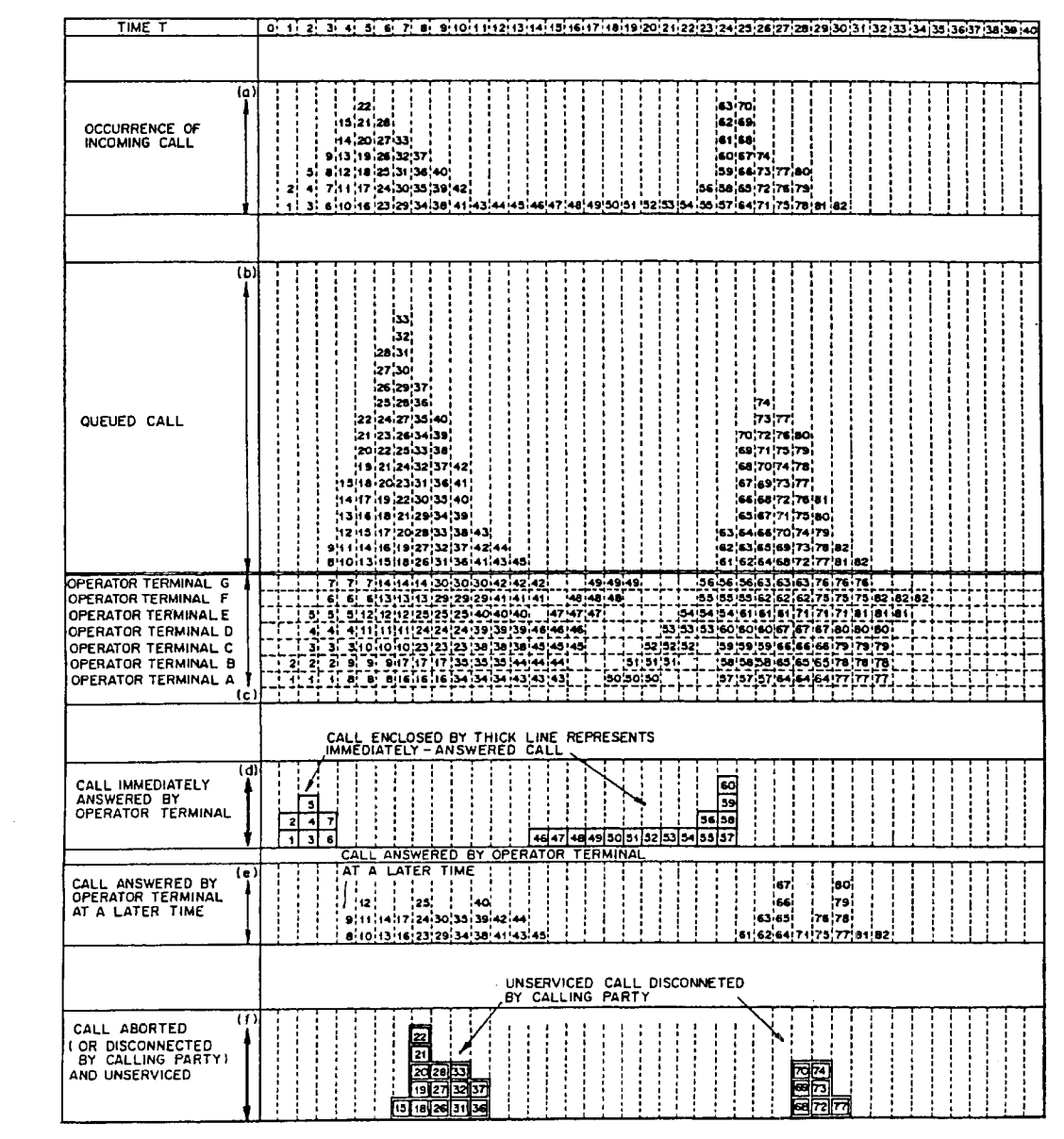

FIG. 31 is a model chart showing the relationship between variations in incoming traffic intensity in the ACD service and answering by the ACD service; and FIG. 32 is a model chart showing the relationship between an incoming call and answering by an operator terminal in another ACD service.

DESCRIPTION OF THE PREFERRED EMBODIMENTS

Preferred embodiments of the present invention will be described hereinbelow by reference to the accompanying drawings.

(A) Description of One Embodiment of the Present Invention

Figure 1:
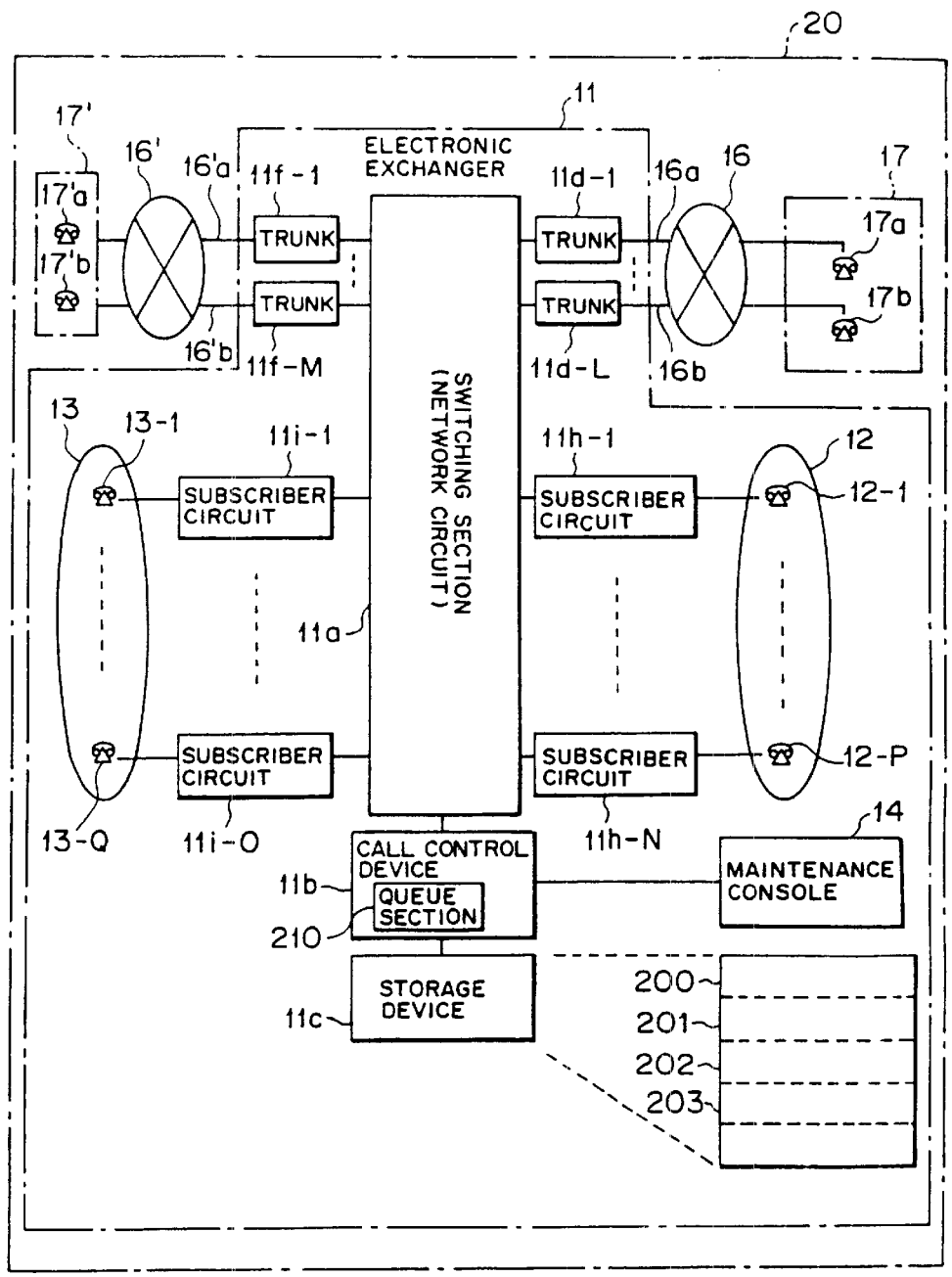
FIG. 1 is a schematic diagram showing the architecture of an ACD system according to one embodiment of the present invention.

FIG. 1 is a schematic diagram showing the architecture of an ACD system according to one embodiment of the present invention. An ACD system 20 shown in FIG. 1 comprises an electronic exchanger 11, public lines 16 and 16', and public switched networks 17 and 17'.

The electronic exchanger 11 connects a designated terminal with a terminal, enables communication between the terminal and the designated terminal, and releases the terminal by disconnecting the connection after completion of communication, thereby rendering the terminal available for the next communication. The electronic exchanger 11 comprises a switching section (network circuit) 11a; a call control device (incoming call processing apparatus) 11b; a storage device 11c; trunk circuits 11d-1 to 11d-L (L is a natural number); trunk circuits 11f-1 to 11f-M (M is a natural number); extension subscriber circuits 11h-1 to 11h-N (N is a natural number); extension subscriber circuits 11i-1 to 11i-O (O is a natural number); an extension terminal group 12; an ACD group 13; and a maintenance console 14.

The switching section 11a connects together terminals—which desire to communicate with each other—from among a large number of terminals and exchanges data between them.

The call control device 11b controls callbacks by means of software, which will be described later. When the ACD system 20 receives an incoming call, the call control device 11b connects the calling party with a terminal so as to establish communication therebetween or to register a callback number. Further, the call control device 11b comprises a queue section 210.

The storage device 11c stores data from a program for executing incoming call processing steps on incoming traffic intensity data and required data such as callback conditions, and comprises a callback condition registration table 200, a call connection status table 201, a callback information registration table 202, and a statistical traffic intensity table 203. Individual incoming call processing steps will be described in detail later.

The trunk circuits 11d-1 to 11d-L are input trunk circuits for accommodating connection lines 16a and 16b, and the trunk circuits 11f-1 to 11f-M are input trunk circuits for accommodating connection lines 16a' and 16b'.

The extension subscriber circuits 11h-1 to 11h-N and 11i-1 to 11i-O interface subscribers using extension lines with the switching section 11a.

The extension terminal group 12 is connected to the switching section 11a by way of the extension subscriber circuits 11h-1 to 11h-N and comprises a plurality of extension terminals 12-1 to 12-P (P is a natural number).

The ACD group 13 is one of a plurality of groups divided according to the types of business. The business used therein imply, for example, acceptance of applications for concert tickets, receipt of phone calls to a broadcast program in which information from an audience is received, and telephone education consultation. Each of the plurality of groups divided according to the types of business comprises operator terminals 13-1 to 13-Q (Q is a natural number) for receiving incoming calls.

Further, the maintenance console 14 is a maintenance tool for inputting the data required for the ACD system 20 to the storage device 11c. Through use of the maintenance console 14, a maintenance technician inputs in advance data regarding predicted traffic intensity of each of the ACD groups 13.

The predicted traffic intensity corresponds to the number of incoming calls per hour in a particular day, the number of incoming calls per weekday, the number of incoming calls per month, and the number of incoming calls per event; namely, data prepared on the basis of past experience.

The public lines 16 and 16' interface the electronic exchanger 11 to the public switched networks 17 and 17'.

More specifically, the public lines 16 and 16' connect ordinary client terminals 17a, 17b, 17'a, and 17'b to the electronic exchanger 11 by way of the connection lines 16a, 16b, 16a', and 16b'.

The function of software used for executing the incoming call processing method will now be described.

Figure 2:
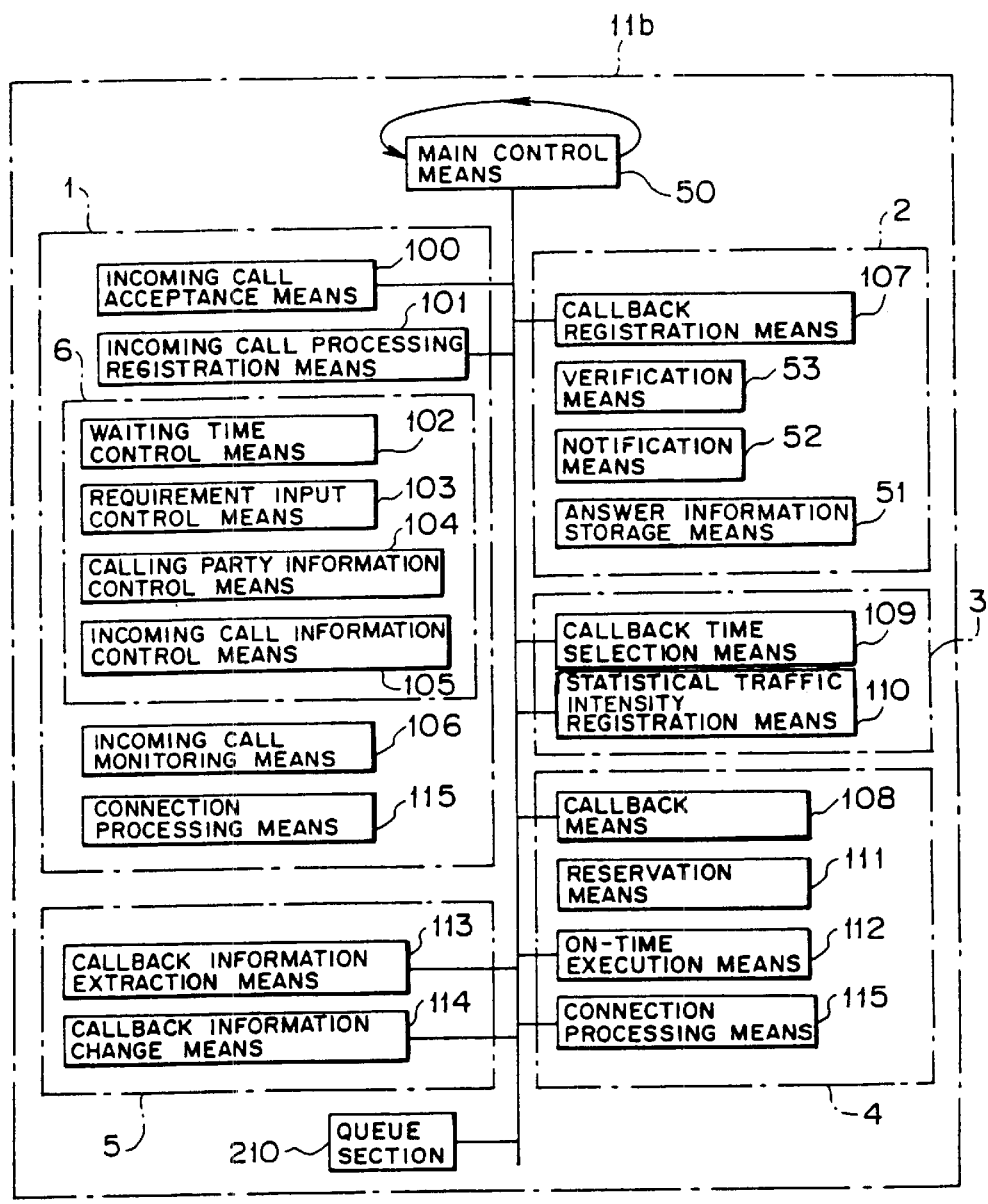
FIG. 2 is a functional block diagram showing a call controller.

FIG. 2 is a functional block diagram showing the call control device 11b which comprises means for performing five types of processing steps. The means performs incoming call processing steps in cooperation with the storage device 11c. More specifically, main control means 50 acts as a main loop and activates and executes five types of means, which will be described below.

① means for performing a step in which a callback is received, the type of the callback is identified, and a connecting operation is carried out;

② means for performing a step in which callback registration is performed;

③ means for performing a step in which a callback time is determined;

④ means for performing a step in which an operator terminal is reserved in preparation for a callback time; and ⑤ means for performing a processing step intended to be performed when another incoming call is received from the same calling party before the calling party is called back.

① Means for Performing a Step in Which a Callback is Received, the Type of the Callback is Identified, and Connection Operation is Carried Out This means performs a three-staged processing step; i.e., (i) determination of the type of a callback, (ii) acceptance of an incoming call, and (iii) connection of the incoming call to a subscriber terminal.

(i) Determination of the type of a callback (hereinafter often referred to as "callback condition") corresponds to branching of processing according to the manner in which the operator terminal calls back the calling party. As shown in the box assigned reference numeral 6 shown in FIG. 2, there is activated only one of waiting time control means 102, requirement input control means 103, calling party information control means 104, and incoming call information control means 105. Processing conditions according to the present invention are determined by the waiting time control means 102, and processing steps are performed after lapse of a certain period of time. For example, if an incoming call cannot connect with an operator terminal by three minutes after having been received by the ACD system 20, a callback processing step is performed. The means that is activated among the four types of means is registered in incoming call processing registration means 101 beforehand.

(ii) Receipt of an incoming call corresponds to selection whether to answer an incoming call immediately when the electronic exchanger 11 receives an incoming call or to call back the calling party of the incoming call at a later time at which the volume of incoming traffic intensity is light. To this end, incoming call acceptance means 100 included in a box assigned reference numeral 1 shown in FIG. 2 is activated first when an incoming call is received. Further, incoming call monitoring means 106 for checking the presence or absence of an available operator terminal is supplementally called up.

(iii) In the connecting operation, if an operator terminal capable of answering an incoming call is available, the calling party of the incoming call is connected to the operator terminal. In contrast, if no operator terminal capable of answering an incoming call is available, one of the operator terminals is reserved. Connection processing means 115 provided in the box assigned reference numeral 1 shown in FIG. 2 is responsible for effecting the connecting operation.

② Means for Performing a Step in which Callback Registration is Performed

When the calling party is not serviced and is to be called back at a later time, this means registers a callback time and a callback phone number. The means is implemented by callback registration means 107, answer information storage means 51, notification means 52, and verification means 53, which are provided in the box assigned reference numeral 2 shown in FIG. 2. The three means 51, 52, and 53 are used for exchanging messages between the calling party and the operator terminal.

③ Means for Performing a Step in which a Callback Time is Determined

At the time of determination of a callback time, the means selects from 24 hours the time period during which the volume of incoming call traffic intensity is light. The thus-selected time period is reported to the calling party. If the calling party approves the time period, the time period is registered. The means performs a time information selection-and-determination step, an answer time determination step, and an answer time designation step. The means is implemented by means of callback time selection means 109 and statistical traffic intensity registration means 110, which are provided in the box assigned reference numeral 3 shown in FIG. 2. The callback time selection means 109 extracts traffic intensity data from the storage device 11c, and the statistical traffic intensity registration means 110 stores traffic intensity data regarding the number of incoming calls per hour in a particular day which are recorded beforehand by the maintenance technician.

④ Means for Performing a Step in Which an Operator Terminal is Reserved in Preparation for a Callback Time When the callback time approaches, the means temporarily secures one operator terminal so that the operator terminal can call back the client terminal at the callback time. The means is implemented by means of callback means 108 which is incessantly and cyclically activated by a timer; reservation means 111 which monitors whether or not the current time is later than the callback time; on-time execution means 112 which connects the operator terminal reserved to the calling party; and the connection processing means 115 for reserving an operator terminal for callback purpose, all of which are provided in the box assigned reference numeral 4 shown in FIG. 2. The four types of means perform an answer operator terminal selection step and an answer operator terminal reserve step.

⑤ Means for Performing a Processing Step Intended to be Performed when Another Incoming Call is Received from the Same Calling Party Before the Calling Party is Called Back The means performs the processing intended to be executed when another call is received from the same calling party before the calling party is called back. The processing can be divided into (i) a step for canceling answer postponement information that has already been registered (i.e., an answer postponement information cancellation step) and (ii) a step for changing the already-registered answer postponement information (i.e., an answer information change step)

(i) In the step for canceling the answer postponement information that has already been registered (i.e., the answer postponement information step), if an operator terminal capable of answering is available when another incoming call is received from the same calling party before the calling party is called back, the answer postponement information is canceled, thereby eliminating a wasteful callback.

(ii) In the step for changing the already-registered answer postponement information again (i.e., the answer information change step), if no operator terminal capable of answering is available, this condition is reported to the client. The callback information is changed, thereby updating the registered information.

Means for performing these two steps (i) and (ii) is implemented by two types of means; namely, callback information extraction means 113 and callback information change means 114, which are provided in the box assigned reference numeral 5 provided in FIG. 2.

The callback information extraction means 113 identifies whether the incoming call is received from a new calling party or from the already-registered calling party, in order to process the incoming call. The callback information change means 114 asks the calling party whether the already-registered callback information is to be changed.

Functions of the individual means ① to ⑤ will be described in detail later.

Figure 3:
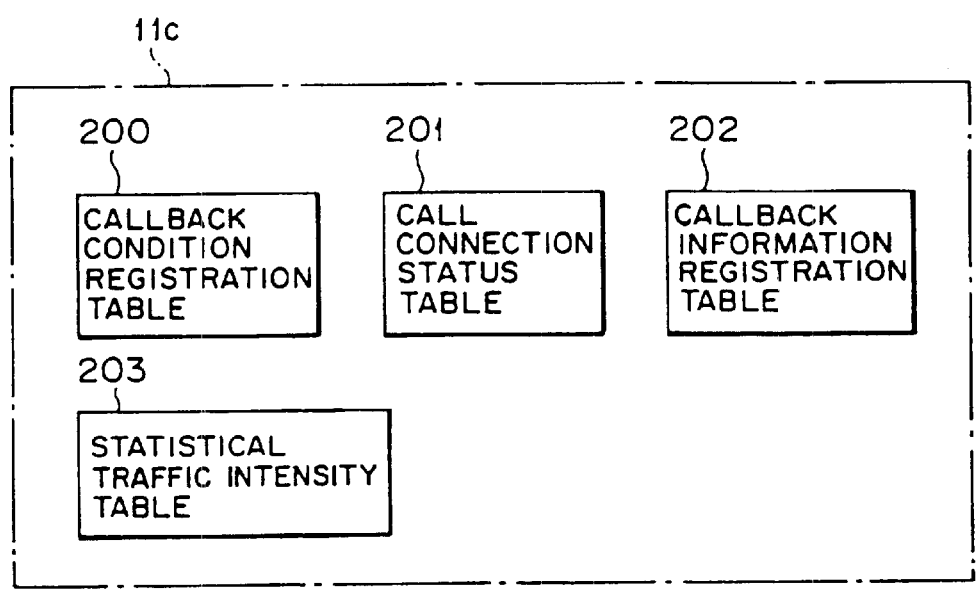
FIG. 3 is a diagrammatic representation showing various tables stored in a storage device.

FIG. 3 shows various tables constituting the principal element of the storage device 11c according to one embodiment of the present invention. The function of the storage device 11c shown in FIG. 3 is to store various types of setting conditions and data and the storage device 11c comprises a callback condition registration table 200 wherein callback conditions are written; a call connection status table 201 for temporarily storing data; a callback information registration table 202 wherein a callback phone number and a callback time are written; and a statistical traffic intensity table 203 wherein incoming traffic intensity data of the past, or the like, are stored.

The individual tables will now be described.

An explanation will first be given of the callback condition registration table 200.

The table is provided for each of the plurality of ACD groups 13 divided according to the types of business. Each table has an area to be used for setting detailed conditions under which a callback is made when the ACD group 13 receives an incoming call. As shown in FIGS. 4(*a*) through 6, the callback condition registration table 200 comprises a region 200-0 to be used for setting the types (TYPES) of callback conditions and regions 200-1, 200-2, 200-3, . . . , 200-255 to be used for storing detailed conditions for respective types.

FIG. 4(*a*) shows one embodiment of the callback condition registration table 200-0 according to the embodiment of the present invention. The callback condition registration table 200-0 shown in FIG. 4(*a*) stores, in region 0 to region 255, the types of callback execution conditions (TYPE) under which the calling party is called back. For each of the regions, a relevant value is selected from a plurality of callback condition values such as those provided in the following items (A) to (E), and the thus-selected callback condition value and a priority can be assigned to the region.

(A) No callback (B) When a waiting time exceeds a threshold value, a callback is made. For instance, if an incoming call cannot be serviced by any operator terminal even after lapse of 60 seconds (threshold value), the calling party of the incoming call is to be called back.

(C) A callback is made under the condition inputted request by the calling party registered.

(D) A callback is made by calling party information (e.g. phone number).

(E) A callback is made by reference to the phone number of the operator terminal reserved for callback.

For example, (A) is assigned TYPE=0; (B) assigned TYPE=1; (C) assigned TYPE=2; (D) assigned TYPE=3; and (E) assigned TYPE=255.

FIG. 4(b) shows one embodiment of the callback condition registration table 200-1. The callback condition registration table 200-1 shown in FIG. 4(b) is used to set waiting time conditions corresponding to TYPE=1 selected from the callback condition registration table 200-0. For example, on condition that a callback is made when a mean waiting time exceeds a threshold value, 3 is written into WTIME(M) and 0 is written into WTIME(B) in order to set the mean waiting time (00 sec.) to 3 minutes.

Figure 5A:
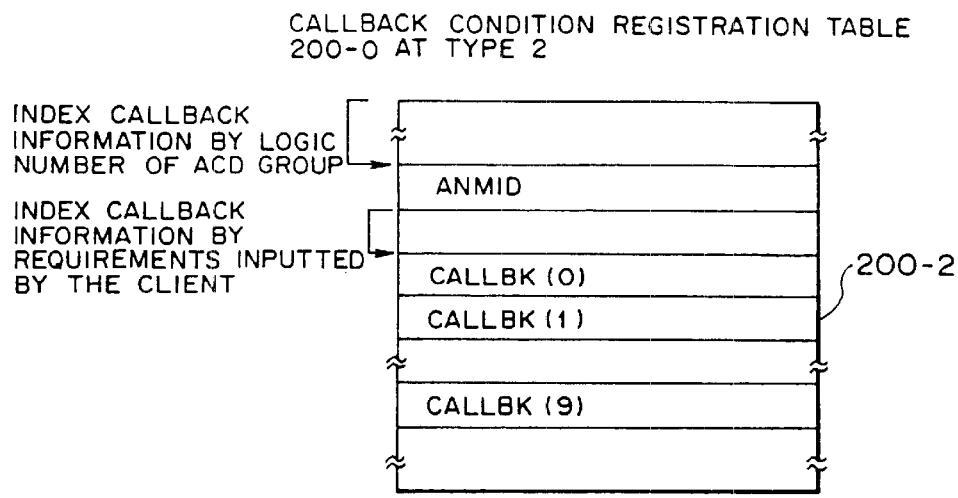
FIG. 5(a) is an illustration for describing one embodiment of theoretical value setting of an announcement to be offered in order to cause a client to enter requirements.

FIG. 5(a) shows one embodiment of the callback condition registration table 200-2. The callback condition registration table 200-2 shown in FIG. 5(a) is used to set detailed conditions corresponding to TYPE=2 selected from the callback condition registration table 200-0. Specifically, a logic value ID regarding an announcement for urging the calling party to enter required data is written into ANMID. In CALLBK(n) (where n is 0 or a positive integer) 0 is written when a callback is to be made, or 1 is written when a call is to be queued.

Figure 5B:
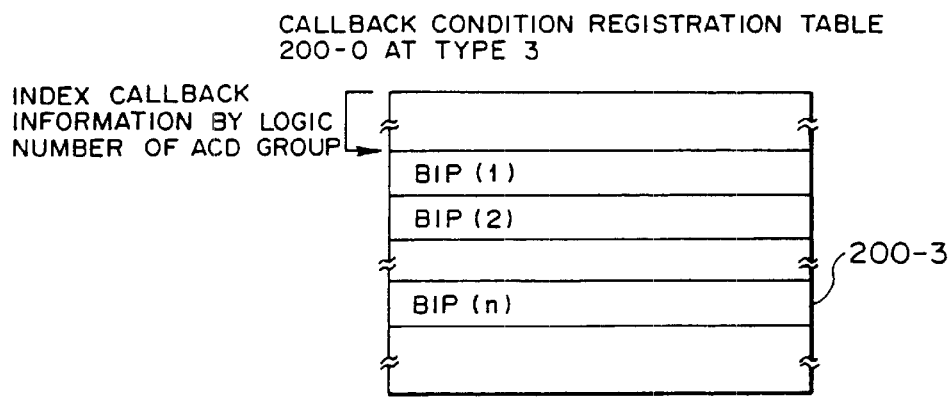
FIG. 5(b) is an illustration for describing one embodiment of setting of a calling party's phone number which is not to be called back.

FIG. 5(b) shows one embodiment of the callback condition registration table 200-3. The callback condition registration table 200-3 is used for setting detailed conditions corresponding to TYPE=3 selected from the callback condition registration table 200-0. More specifically, the phone number of the calling party which does not require a callback is written into BIP.

Figure 6:
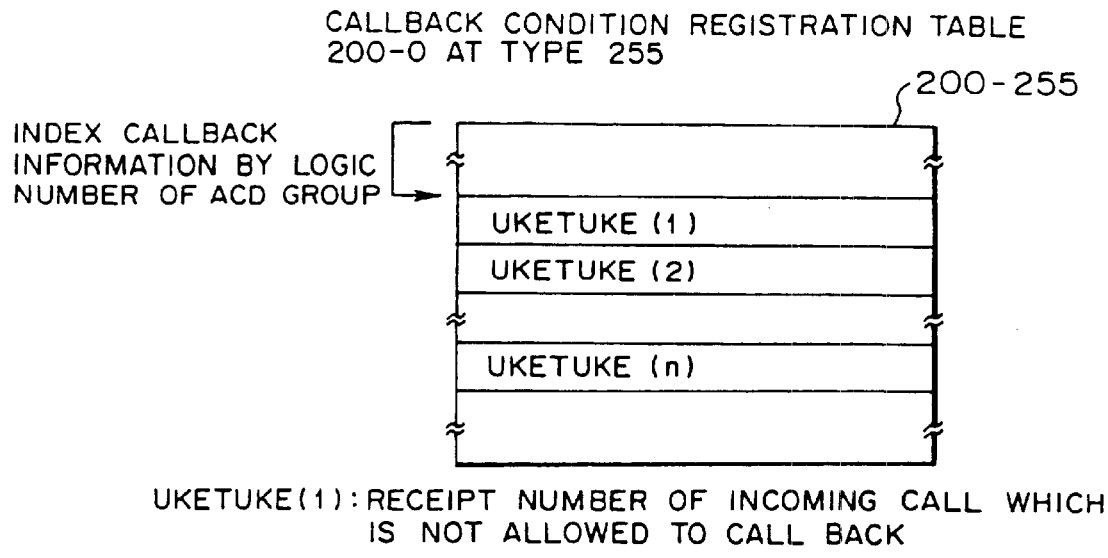
FIG. 6 is an illustration for describing one embodiment of setting of an incoming call acceptance number which is not to be called back.

FIG. 6 shows one embodiment of the callback condition registration table 200-255. The callback condition registration table 200-255 shown in FIG. 6 is used for setting detailed conditions corresponding to TYPE=255 selected from the callback condition registration table 200-0. Specifically, the phone number of the operator terminal which is prohibited from making a callback is written into UKETUKE(n) (n is a positive integer).

These tables can store a plurality of conditions. For example, within the callback condition registration table 200-0, as the primary conditions, numeral 2—which represents a callback involving entry of requirements—can be written into region 0 and numeral 1—which represents a callback to be made when a mean waiting time exceeds a threshold value—can be stored in region 1. Such a configuration enables flexible settings; for example, when the ACD group 13 receives an incoming call, the calling party of the incoming call is asked to enter requirements; and if it is determined that the calling party does not require a callback, a waiting time is determined once again.

In order to perform operations under the plurality of conditions, operations are performed first under the primary conditions, and a determination is made as to whether or not additional conditions exist. Only when additional conditions exist, operations are continuously.

The call connection status table 201 will now be described.

Figure 7:
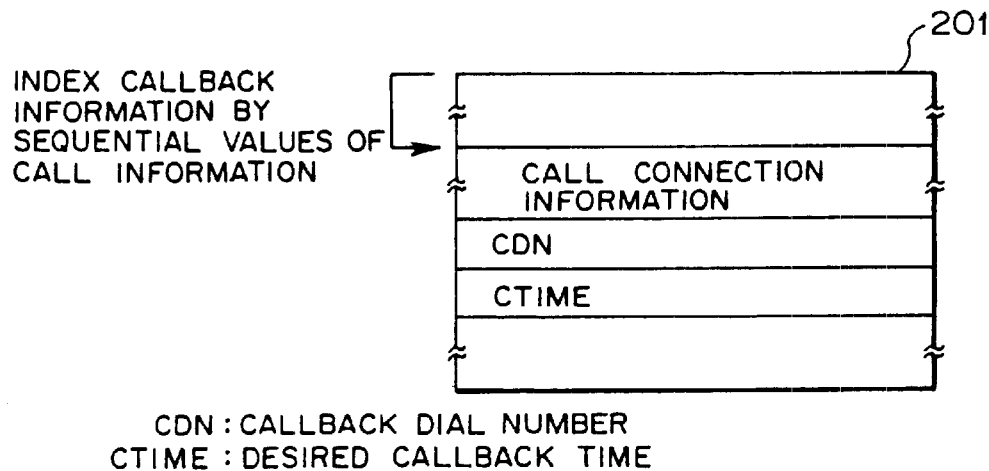
FIG. 7 is an illustration for describing one embodiment of a call connection status table.

FIG. 7 shows one embodiment of the call connection status table 201. The call connection status table 201 is used for temporarily storing data on each incoming call, such as information about the calling party which requires a callback. The data are held only for a period during which the call is in progress. More specifically, the dial number of the calling party which requires a callback is written into CDN, and a desired callback time is written into CTIME.

An explanation will now be given of the callback information registration table 202.

Figure 8:
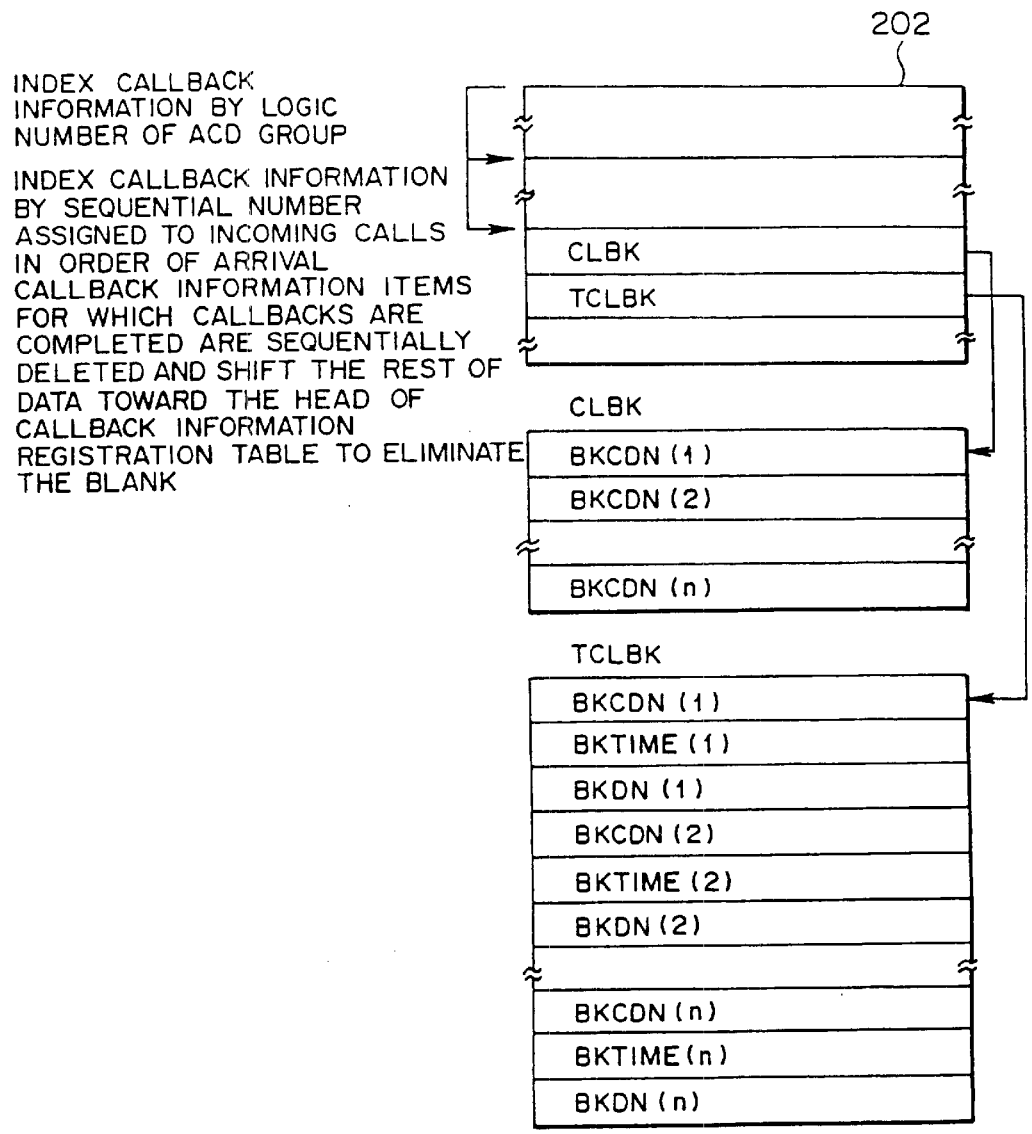
FIG. 8 is an illustration for describing one embodiment of a callback information registration table.

FIG. 8 shows one embodiment of the callback information registration table 202. When need for a callback is determined, the callback information registration table 202 stores a callback phone number, a callback time, and the phone number of an operator terminal reserved for callback (i.e., the phone number of the reserved operator terminal), in sequence of arrival of an incoming call. Further, the callback information registration table 202 is provided for each of the ACD groups 13.

Callback information is written according to the flow provided below. First, callback information is indexed by the logic number of the ACD group 13. The callback information is further indexed by a sequential number which is sequentially assigned to incoming calls. The callback information is delivered to a CLBK area or a TCLBK area.

The CLBK area is used for callbacks to be made at undesignated times, and the TCLBK area is used for callbacks to be made at designated times. The TCLBK area has three types of values; e.g., BKCDN, BKTIME, and BKDN. The BKCDN value represents the phone number of the client, and the BKTIME value represents a callback time. The BKDN value represents the dial number of the operator table reserved for callback. In the case where time periods are registered for the ACD group 13, these values are sorted according to chronological order.

The statistical traffic intensity table 203 will now be described.

Figure 9:
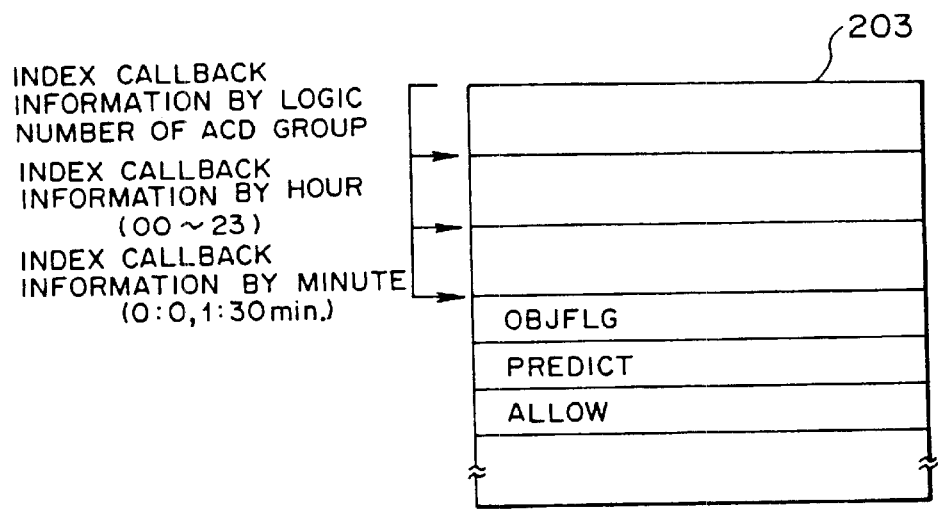
FIG. 9 is an illustration for describing a schematic structure of a statistical traffic intensity table.

FIG. 9 schematically shows the architecture of the statistical traffic intensity table 203. The statistical traffic intensity table 203 shown in FIG. 9 is a storage area to be used for extracting a callback time and a callback time period. A callback time and a callback time period are extracted according to the following flow. First, they are indexed by the logic number of the ACD group 13. They are further indexed by a callback hour (ranging from 00 to 23) and are indexed by a callback minute (0 represents the first half of an hour; i.e., from 00 to 29 minutes, and 1 represents the latter half of an hour; i.e., from 30 to 59 minutes). They are then delivered to OBJFLG, which is an object-of-operation flag representing whether or not the operator terminal is activated. If a logical value of 0 is written in OBJFLG, the operator terminal is inactive. In contrast, if a logical value of 1 is written in OBJFLG, the operator terminal is active. If the time at which the operator terminal is activated falls outside the service hours, a logical value of 0 is assigned to OBJFLG. PREDICT represents a predicted traffic intensity value based on empirical data and assumes a value which differs from one hour to another. ALLOW represents the volume of traffic intensity which the operator terminals can process.

Figure 10:
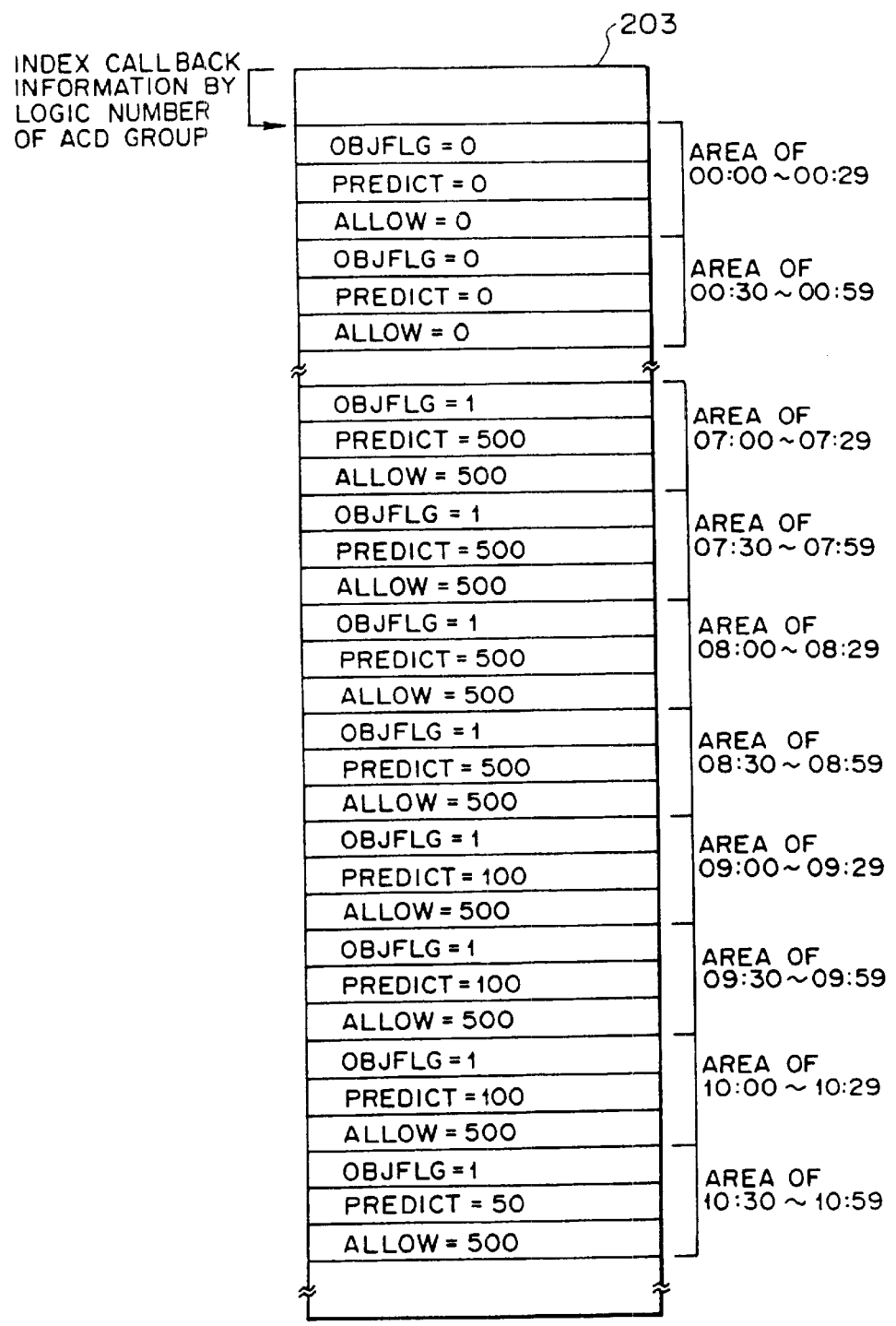
FIG. 10 is an illustration for describing one embodiment of a statistical traffic intensity table.

FIG. 10 shows one embodiment of the statistical traffic intensity table 203 that is indexed by the logic number of the ACD group 13. The statistical traffic intensity table 203 shown in FIG. 10 comprises time period areas which start from 00:00 and comprise thirty-minute segments such that the first time period area covers 00:00 to 00:29. Each time period area stores three types of values, i.e., the object-of-operation flag (OBJFLG), the predicted traffic intensity (PREDICT), and the acceptable traffic intensity (ALLOW).

These values are entered by the maintenance technician beforehand through use of the maintenance console 14. The call control device lib activates the statistical traffic intensity registration means 110, which in turn writes predicted traffic intensity into the statistical traffic intensity table 203 of the storage device 11c.

The data are based on incoming traffic intensity data of the past. To set the data, it is desirable that several types of model traffic intensity patterns be prepared, that a relevant traffic intensity pattern be selected from the model patterns, and that the thus-selected model traffic intensity pattern be fine-tuned in accordance with events of the day. Further, it is also desirable that the statistical traffic intensity registration means 110 be activated at the appointed time, thereby automatically updating the traffic intensity pattern for each day of the week or for each month.

Traffic intensity U (erlangs) corresponds to traffic volume per second. More specifically, traffic intensity U corresponds to the time period during which a communications path is occupied by communication and is represented on a per-second basis. Traffic intensity U is expressed by the following equation in terms of mean holding time H (sec.) and the number of calls C.

$$U = H \times C \tag{1}$$

The mean holding time H represents a mean time during which the facility is used, and the number of calls C represents the number of calls received by the ACD system within a unit time. The mean holding time H is defined as follows. Provided that "n" calls are received within a period of T seconds and that the holding time of each of the calls (i.e., the time during which the facility is used) is represented as $h_1, h_2, \ldots, h_n$, a total time period during which the system is used is represented as $\Sigma h_i$, and hence the mean holding time H is given as follows:

$$H = \Sigma h_i / n \tag{2}$$

Here $\Sigma h_i$ represents a total sum of holding times from $h_1$ to $h_n$.

Figure 11:
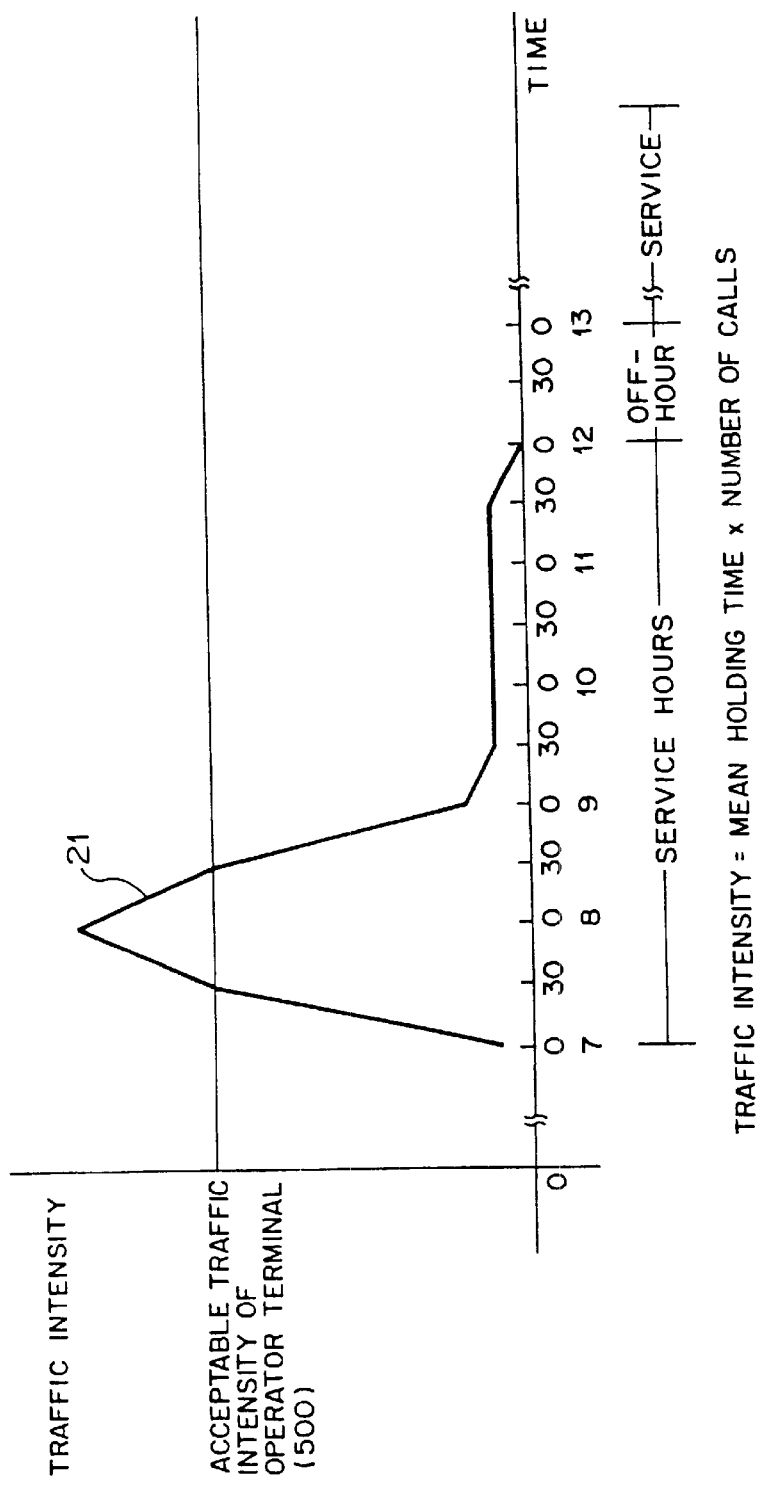
FIG. 11 is a plot showing a transition curve of traffic intensity during a single day.

FIG. 11 is a curve showing a transition of traffic intensity during a particular day. As shown in FIG. 11, a transition curve 21 is plotted on the basis of empirical data regarding the traffic intensity of the day.

An incoming call is accepted by means of the foregoing system architecture.

When the ACD system receives an incoming call, the main control means 50 activates the incoming call acceptance means 100, thereby extracting callback conditions and finding an operator terminal capable of answering from among the operator terminals 13-1 to 13-Q. If an operator terminal capable of answering is available, the operator terminal starts talking with the calling party of the incoming call. In contrast, if no operator terminal is available, the main control means 50 registers the phone number of the calling party for a callback at a later time.

More specifically, the electronic exchanger 11 receives an incoming call from the client terminal 17a while traffic intensity data are registered in the electronic exchanger 11 (an incoming call arrival step). A determination is made as to whether to answer the incoming call immediately or to answer the incoming call at a later time at which the volume of incoming calls is light(an incoming call acceptance step). The incoming call is serviced according to the type of answer determined in the incoming call acceptance step (an answer step).

In terms of operation, there exist three callback methods (a) to (c) as provided below, and the present invention employs and is worked under method (c).

(a) The callback time selection means 109 reports to the client terminal 17a a time period which is registered beforehand and during which the volume of incoming calls is light. In contrast, the client terminal 17a waits for connection, just as is. This method is identical with the existing method under which the calling party is required to wait until connected to an operator terminal.

(b) The callback time selection means 109 reports to the client terminal 17a the previously-registered time period during which the volume of incoming calls is light and disconnects the call.

(c) The callback time selection means 109 automatically issues an audio message to the client terminal 17a, thus requiring entry of the phone number of the client terminal 17a. In this state, upon receipt from the client terminal of messages regarding a phone number and a time period, the callback time selection means 109 stores information about these messages in the tables provided in the storage device 11c and disconnects the call.

The method (c) can be explained as follows while correspondence with individual processing steps is shown.

Under this incoming call processing method, with regard to the incoming call that is selected in the incoming call acceptance step to be answered at a later time, the callback time selection means 109 selects and determines information about the time at which the incoming call can be serviced (a time information selection-and-determination step), reports the time information selected and determined in the time information selection-and-determination step (a first notification step), verifies an approval of the calling party for the time information reported in the first notification step (a verification step), and determines as answer time information the time information that in the verification step is verified to be approved by the calling party (an answer time determination step).

The time information selection-and-determination step is arranged so as to enable selection and determination of a time at which the operator terminal can answer the incoming call that is selected in the incoming call acceptance step to be answered at a later time.

In place of the method in which the callback time selection means 109 designates a callback time, there may be employed a method in which candidate callback times are offered to the calling party for selection. More specifically, the callback time selection means 109 (a time information selection-and-determination step) selects a plurality of time periods and offers the thus-selected time periods to the client terminal 17a (a first notification step). Upon receipt of a phone number input message from the client terminal 17a in such a state (a verification step), the answer information storage means 51 stores the phone number of the client terminal 17a and the designated callback time into the tables within the storage device 11c and disconnects the call (an answer time designation step).

As a result, the time information selection-and-determination step is arranged so as to enable selection and determination of a time period during which the operator terminal can answer the incoming call that is selected in the incoming call acceptance step to be answered at a later time. Subsequent to the first notification step, there is provided the answer time designation step in which the calling party designates a desired time period from among the answer time periods determined in the time information selection-and-determination step. The notification step is arranged so as to enable verification of the time period designated in the answer time designation step.

When the callback time approaches, an operator terminal is temporarily reserved. At the callback time, the client terminal 17a is automatically connected to the thus-reserved operator terminal which can answer (an answer operator terminal selection step and an answer operator terminal reservation step).

More specifically, for the incoming call selected in the incoming call acceptance step to be answered at a later time, the incoming call processing method comprises an answer operator terminal selection step of selecting an operator terminal which is to answer the incoming call at the answer time determined in the answer time determination step, and an answer operator terminal reservation step of reserving for answering purposes the operator terminal selected in the answer operator terminal selection step.

If there arises another incoming call from the client terminal 17a before a callback is made and the incoming call can be serviced by the operator terminal 17a, the registered callback information is deleted (an answer postponement information cancellation step). If the second incoming call cannot be serviced, an opportunity to change the registered callback information is offered to the calling party (an answer time change step).

More specifically, the incoming call processing method comprises the answer postponement information cancellation step in which answer postponement information is cancelled on condition that, if the second incoming call is received from the same calling party before the operator terminal answers, in the answer step, the first incoming call that is selected in the incoming call acceptance step to be answered at a later time, the operator terminal can answer and talk with the calling party. Further, the incoming call processing method comprises a second notification step in which if the second incoming call is received from the same calling party before the receptionist terminal answers, in the answer step, the first incoming call that is selected in the incoming call acceptance step to be answered at a later time and if no operator terminal can answer the second incoming call, this condition is communicated to the calling party. Moreover, the incoming call processing method comprises the answer time change step in which the answer time determined in the answer time determination step can be changed in association with the reporting action in the second notification step.

Accordingly, the call control device 11b according to the present invention comprises predicted traffic intensity information storage means for storing predicted traffic intensity information about incoming calls received by the electronic exchanger 11;

incoming call acceptance means for determining whether to answer the incoming call immediately or to answer the incoming call at a later time at which the volume of incoming traffic intensity is light;

time information selection-and-determination means for selecting and determining information about the time at which the incoming call that has been selected by the incoming call acceptance means to be answered at a later time can be answered, on the basis of the predicted traffic intensity information stored in the predicted traffic intensity information storage means;

first notification means for reporting to a calling party the time information selected and determined by the time information selection-and-determination means;

verification means for verifying an approval of the calling party regarding the time information report made by the first notification means;

answer time storage means for determining and storing as answer time information the time information that is approved by the calling party by way of the verification means; and answer means which immediately answers the incoming call if the incoming call acceptance means has determined that the incoming call is to be answered immediately and which answers the incoming call at the time stored in the answer time storage means if the incoming call acceptance means has determined that the incoming call is to be answered at a later time.

Further, the call control device 11b comprises operator terminal selection means for selecting an operator terminal which is to answer the incoming call, which has been selected by the incoming call acceptance means to be answered at a later time, at the answer time determined by the incoming call acceptance means; and operator terminal reservation means for reserving the operator terminal selected by the operator terminal selection means for answering the incoming call.

In addition, the call control device 11b comprises answer postponement information cancellation means for canceling the postponement information on condition that the operator terminal can answer and finish talking if there arises another incoming call from the same calling party before the operator terminal answers the incoming call that has been selected time by the incoming call acceptance means to be answered at a later time; second notification means for informing the calling party that no operator terminal can answer if there arises another incoming call from the same calling party before answering the incoming call, which has been selected by the incoming call acceptance means to be answered at a later time; and answer time change means capable of changing the answer time, which has been determined by the answer time determination means, in association with the reporting operation of the second notification means.

Operations of means having the functions of performing the processing steps according to the present embodiment will be individually described while correspondence with means ① to ⑤ is shown.

① Means for Determining the Type of a Callback, Accepting an Incoming Call, and Performing a Connecting Operation When the operator terminal receives an incoming call from the client terminal 17a, the incoming call acceptance means 100 is activated first. The incoming call acceptance means 100 extracts from the callback condition registration table 200 a callback condition which is registered beforehand for the time of arrival of an incoming call and activates means corresponding to the thus-extracted callback condition.

Figure 12:
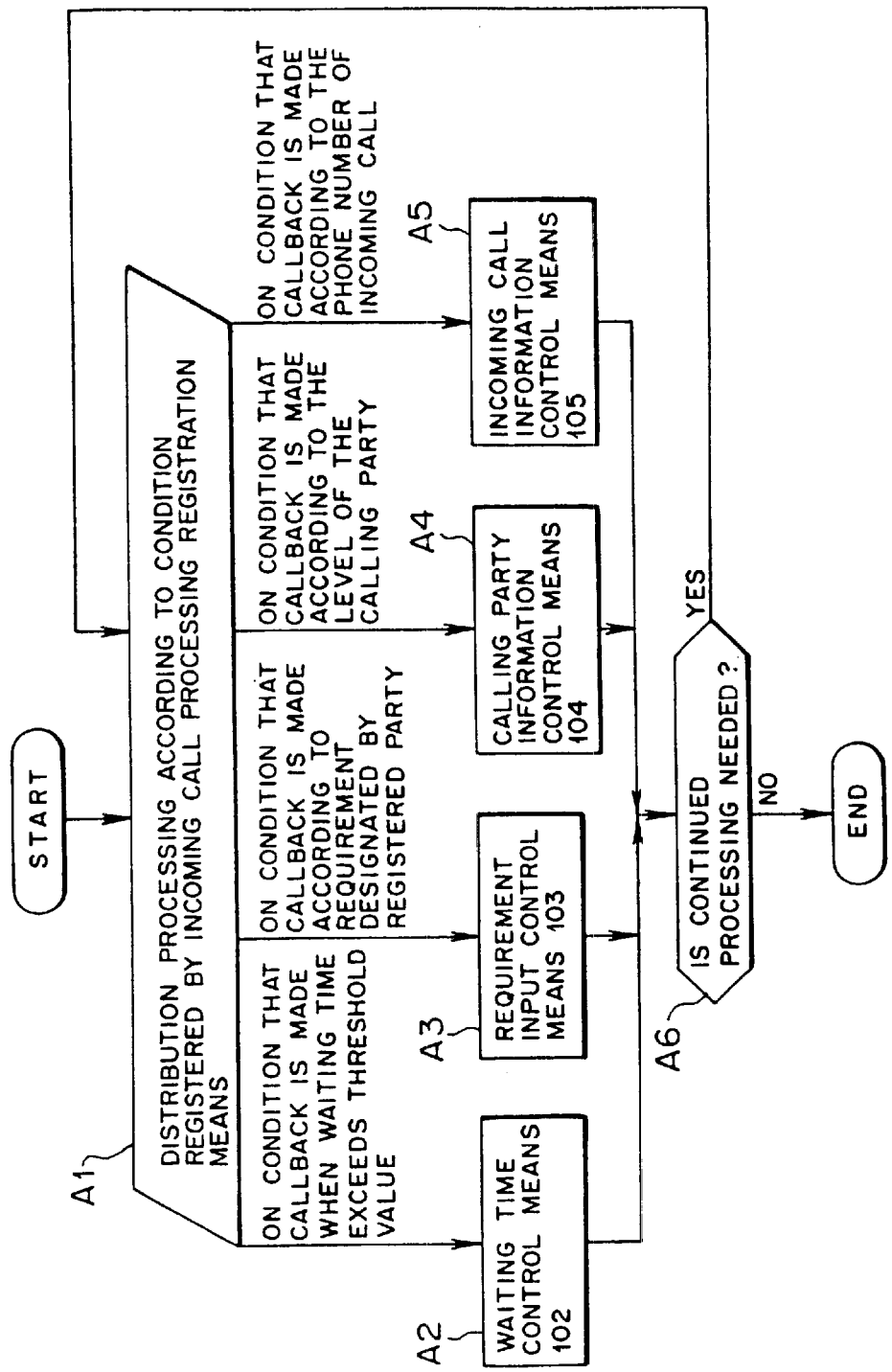
FIG. 12 is a flowchart for describing the function of incoming call receiving means.

FIG. 12 is a flowchart for the incoming call acceptance means 100. A callback condition, which has been registered beforehand, is extracted at the time of receipt of an incoming call, thus branching the processing (step A1). In the present embodiment, the callback condition is limited to a condition that a callback is made when a waiting time exceeds a threshold value, and the waiting time control means 102 is activated (step A2). Further, there exists another callback condition. If the callback condition specifies that a callback is to be made according to the requirement designated by the registered calling party, the requirement input control means 103 is activated (step A3). Alternatively, if the callback condition specifies that a callback is to be made depending on the level of the calling party, the calling party information control means 104 is activated (step A4). Alternatively, if the callback condition specifies that a callback is to be made by dialing the phone number of the incoming call, the incoming call information control means 105 is activated (step A5) These conditions may be combined with the condition that a callback is made when a waiting time exceeds a threshold value. Therefore, if there is a need to continuously perform processing, the processing is carried out again from step A1 (step A6).

Figure 13:
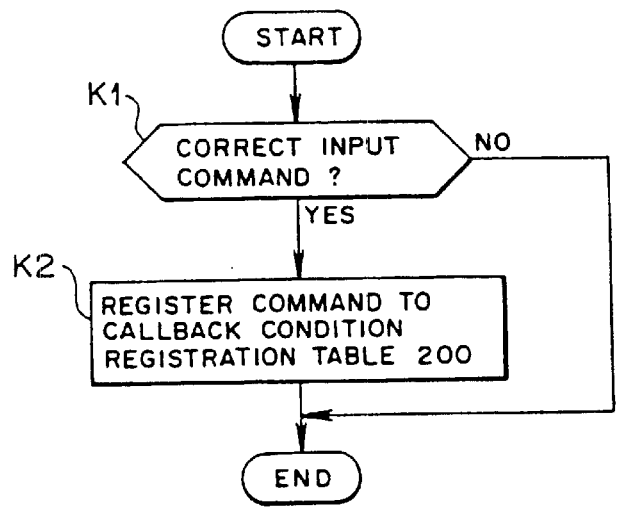
FIG. 13 is a flowchart for describing the function of incoming call processing means registration means.

The incoming call processing registration means 101 writes into the callback condition registration table 200 callback conditions for the time of arrival of an incoming call beforehand. FIG. 13 shows a flowchart for the incoming call processing registration means 101. As shown in FIG. 13, the incoming call processing registration means 101 receives a command (step K1) and registers the command into the callback condition registration table 200 (step K2).

The waiting time control means 102 (which will be described in detail later by reference to FIG. 16) determines whether to answer the incoming call immediately or to call back the calling party of the incoming call.

The incoming call monitoring means 106 determines whether an operator terminal is available, by monitoring the calls stored in the queue section 210.

The connection processing means 115 (which will be described in detail later by reference to FIG. 24) performs ordinary connection processing. If an operator terminal is available, the connection processing means 115 connects the client terminal 17a to the operator terminal. After completion of talking, the connection processing means 115 deletes the callback information that has been registered.

Another function of the connection processing means 115 is to reserve an operator terminal for callback purpose. More specifically, the connection processing means 115 monitors whether or not a reservation requirement flag is set on the queued call. If the queued call has the flag, the connection processing means 115 sets one of the operator terminals in such a way that the operator terminal becomes unable to receive an incoming call for ACD service and unable to originate a call and reserves the operator terminal for callback purposes. The connection processing means 115 executes two processing operations through use of an identical subroutine.

The queued call corresponds to a call stored in the queue section 210. From whether or not the queued call has a reservation requirement flag, it can be seen whether or not a calling party is called back. If the queued call has a reservation requirement flag, there is a need to temporarily ensure one operator terminal for callback purpose. Reservation of an operator terminal is carried out by another means. If an operator terminal is reserved, the main control means 50 searches for the phone number of the thus-reserved operator terminal from the top of the callback information registration table 202 and brings the operator terminal into an unset condition. The queued call that requires a callback from the operator terminal is disconnected. After the operator terminal has been connected to the client terminal 17a, the main control means 50 deletes one callback information item regarding the queued call.

② Means for Performing a Step in which Callback Registration is Performed

When the client terminal 17a cannot connect with an operator terminal, the callback registration means 107 (which will be described in detail later by reference to FIG. 17) causes the client terminal 17a to register the phone number of the client and a callback time.

Another function of the callback registration means 107 offers an opportunity to change the already-registered information to the calling party in a case where although there is another incoming call from the same calling party after the calling party has been registered for callback and before the calling party is called back, the second call is not connected.

The answer information storage means 51 updates the callback information by writing into the callback information registration table 202 the phone number of the client terminal 17a and a callback time.

The notification means 52 reports to the client terminal 17a from the operator terminal a message regarding a time and a time period or a message regarding a phone number. The notification means 52 reports to the calling party the time information selected and determined in the time information selection-and-determination step (a first notification step). Alternatively, if another incoming call is received from the same calling party before the incoming call, which has been selected in the incoming call acceptance step to be answered at a later time, and the second incoming call cannot be answered, the notification means 52 reports to the calling party that no operator terminal can answer (a second notification step).

For example, in the case of a message stating that "We will call you back at nine o'clock. If this is acceptable, please press 0#. If this is not acceptable, please press 1#," the notification means 52 inserts nine o'clock into the message and reports the message to the client terminal 17a. In the case of a message stating that "We will call you back during the hours from nine o'clock to eleven o'clock. If this is acceptable, please enter four digits to designate a desired time period within the given hours (e.g., 1030 for 10:30). If this is not acceptable, please press the sharp (#) key," the notification means 52 inserts a time period of 9:00 to 11:00 into the message and reports the message to the client terminal 17a from the operator terminal.

The verification means 53 decodes the message transmitted to the operator terminal from the client terminal 17a. Specifically, the verification means 53 has the function of receiving an approval message returned from the client terminal 17a in response to the phone number and the callback time reported by the notification means 52.

③ Means for Performing a Step for Determining a Callback Time

The callback time selection means 109 (which will be described in detail later by reference to FIG. 22) extracts the data from the statistical traffic intensity table 203. From the thus-extracted data, the callback time selection means 109 selects, as candidates times, times which are later than the current time and satisfy a relevant condition. The relevant condition is a condition that an object-of-measurement flag is activated and acceptable traffic intensity is greater than the predicted traffic intensity.

Figure 14:
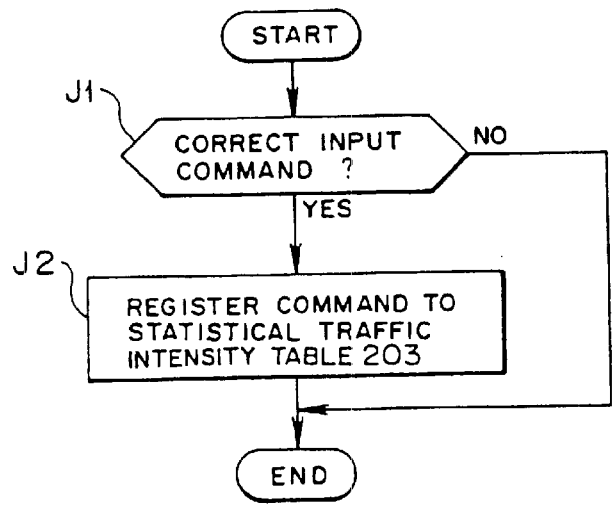
FIG. 14 is a flowchart for describing the function of statistical traffic intensity registration means.

The statistical traffic intensity registration means 110 writes predicted traffic intensity data into a statistical traffic intensity table 203. FIG. 14 shows a flowchart for the statistical traffic intensity registration means 110. As shown in FIG. 14, upon receipt of a command (step J1), the statistical traffic intensity registration means 110 writes predicted statistical traffic intensity data into the statistical traffic intensity table 203 (step J2).

④ Means for Performing a Step for Reserving an Operator Terminal in Preparation for a Callback Time The callback means 108 (which will be described in detail later by reference to FIG. 18) makes a callback only when an operator terminal which can answer is available.

The reservation means 111 (which will be described in detail later by reference to FIG. 19) determines whether or not the current time is close to the callback time. Specifically, if, on the basis of the data at the top of the callback information registration table 202, the reservation means 111 determines that the callback time is approaching, a reservation flag is set on the queued call, thereby placing the queued call at the head of the queue section 210. The expression "callback time is approaching" means that that only a brief time period remains before the callback time. For example, if the callback time is 10:00 and the time period is five minutes, the reservation means 111 is activated when the time becomes 9:55. The brief time period can also be changed.

The on-time execution means 112 (which will be described in detail later by reference to FIG. 20) establishes a callback connection between the client terminal 17a and the operator terminal reserved for callback purpose. After completion of the callback, the on-time execution means 112 deletes the data at the top of the callback information registration table 202, thereby releasing the reserved operator terminal.

(5) Means for Performing a Step of Executing the Processing Intended to be Performed if Another Incoming Call Arrives from the Same Calling Party Before the Calling Party is Called Back The callback information extraction means 113 determines whether the incoming call is a call from a new calling party or another call from the already-registered calling party. The callback information extraction means 113 retrieves the callback information registration table 202 according to the phone number of the client terminal 17a, thereby extracting the callback information registered therein. If no callback information is registered, the callback information extraction means 113 newly registers the phone number of the calling party. In contrast, if callback information is registered, the callback information extraction means 113 offers to the client terminal 17a an opportunity to change the registered information by asking the calling party his phone number and whether to change the phone number.

The callback information change means 114 asks the calling party whether to change the already-registered callback information to new information.

Incoming call processing steps are performed by activation of the individual means, which have been described in detail, as necessary.

Figure 15:
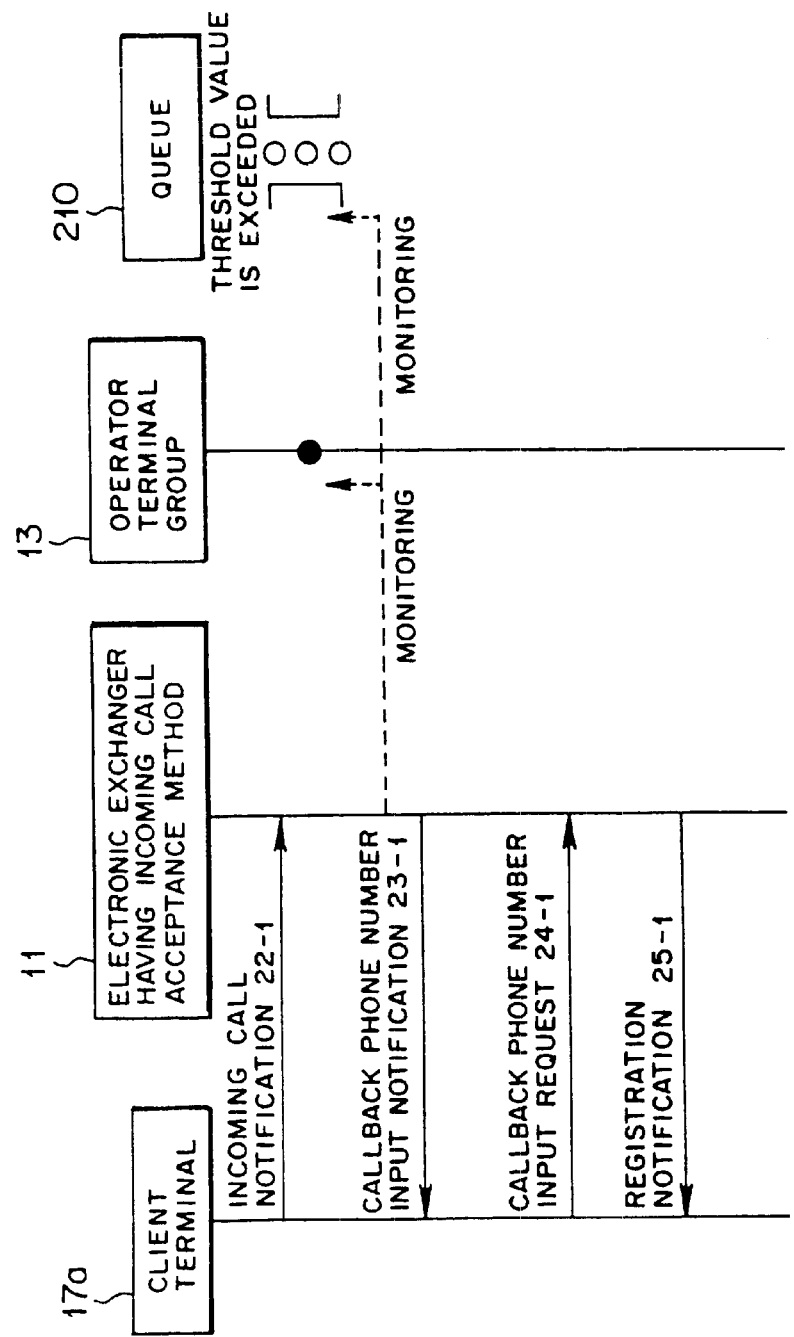
FIG. 15 is a diagram for describing a sequence of procedures to be performed between a client terminal and an exchange from the time an ACD system receives an incoming call until the time a callback phone number is registered.

FIG. 15 shows sequence performed between the calling party and the electronic exchanger 11 from arrival of an incoming call to the ACD system until registration of a callback. As shown in FIG. 15, if no operator terminal is available when the electronic exchanger 11 receives an incoming call notification 22-1 from the client terminal 17a (indicated by a solid circle), the electronic exchanger 11 sends a callback phone number input notification 23-1 to the client terminal 17a. When a callback phone number input request 24-1 is returned from the client terminal 17a, a registration notification 25-1 is transmitted.

More specifically, when the client terminal 17a provided in the public switched network 17 originates a call, the ACD group 13 receives the incoming call notification 22-1 by way of the connection line 16a, the trunk circuit 11d-1, the switching section 11a, and the subscriber circuit 11i-1. The main control means 50 activates the incoming call acceptance means 100.

The incoming call acceptance means 100 activates the waiting time control means 102. A flowchart for the waiting time control means 102 is shown in FIG. 16.

The waiting time control means 102 selects whether to answer the incoming call immediately or to callback the calling party of the incoming call. The waiting time control means 102 finds an operator terminal which can immediately answer from among the plurality of operator terminals. If an operator terminal which can answer is available, the waiting time control means 102 connects the operator terminal to the client terminal 17a. In contrast, no operator terminal which can answer is available, the waiting time control means 102 registers the information required for callback, i.e., the phone number of the calling party and a callback time.

Figure 16:
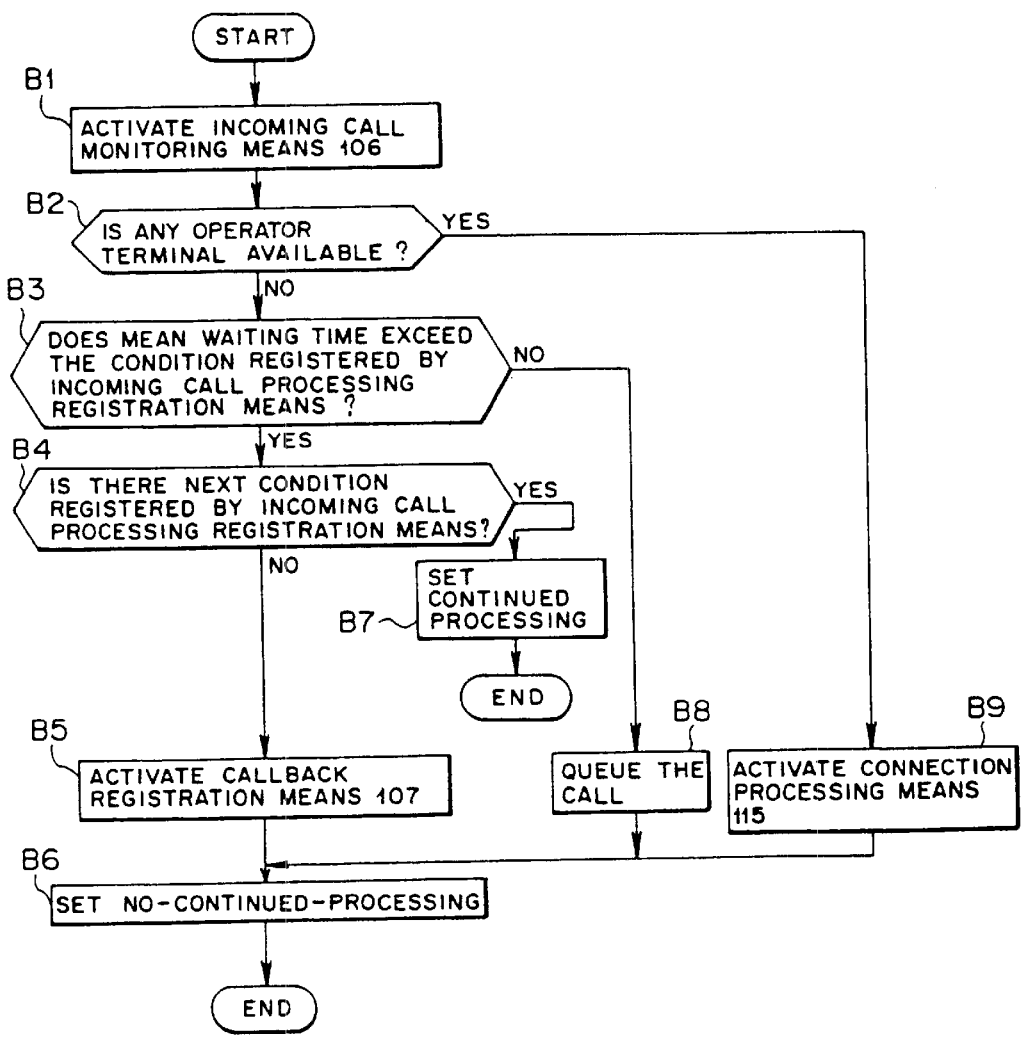
FIG. 16 is a flowchart for describing the function of waiting time control means.

In step B1 shown in FIG. 16, the waiting time control means 102 activates the incoming call monitoring means 106, which in turn determines which of the operator terminals 13-1 to 13-Q can answer (step B2).

If an operator terminal which can answer is available, the connection processing means 115 is activated to thereby complete talking (step B9). Since there is no need to process another call at this time, the waiting time control means 102 clears a continued processing flag, thereby completing the processing (step B6).

However, if no operator terminal is available and a mean waiting time exceeds the time that is registered in the callback condition table 200-1 beforehand, e.g., three minutes (step B3), the waiting time control means 102 determines whether or not another callback condition is set (step B4). If there is no continued processing such as that required for another callback condition, the callback registration means 107 is activated (step B5), thereby storing the information necessary for the operator terminal to make a callback, i.e., callback information such as the phone number of the client terminal and a callback time, into the tables within the storage device 11c. In this case, the waiting time control means 102 does not set a continued processing flag and completes the processing (step B6). If there is continued processing in step B4, the waiting time control means 102 sets a continued processing flag without registering callback information (step B7).

In a case where no operator terminal which can answer is available and a mean waiting time has not yet exceeded three minutes (step B3), the waiting time control means 102 places the call into the queue section 210 (step B8), thus completing the processing without setting a continued processing flag (step B6).

Figure 17:
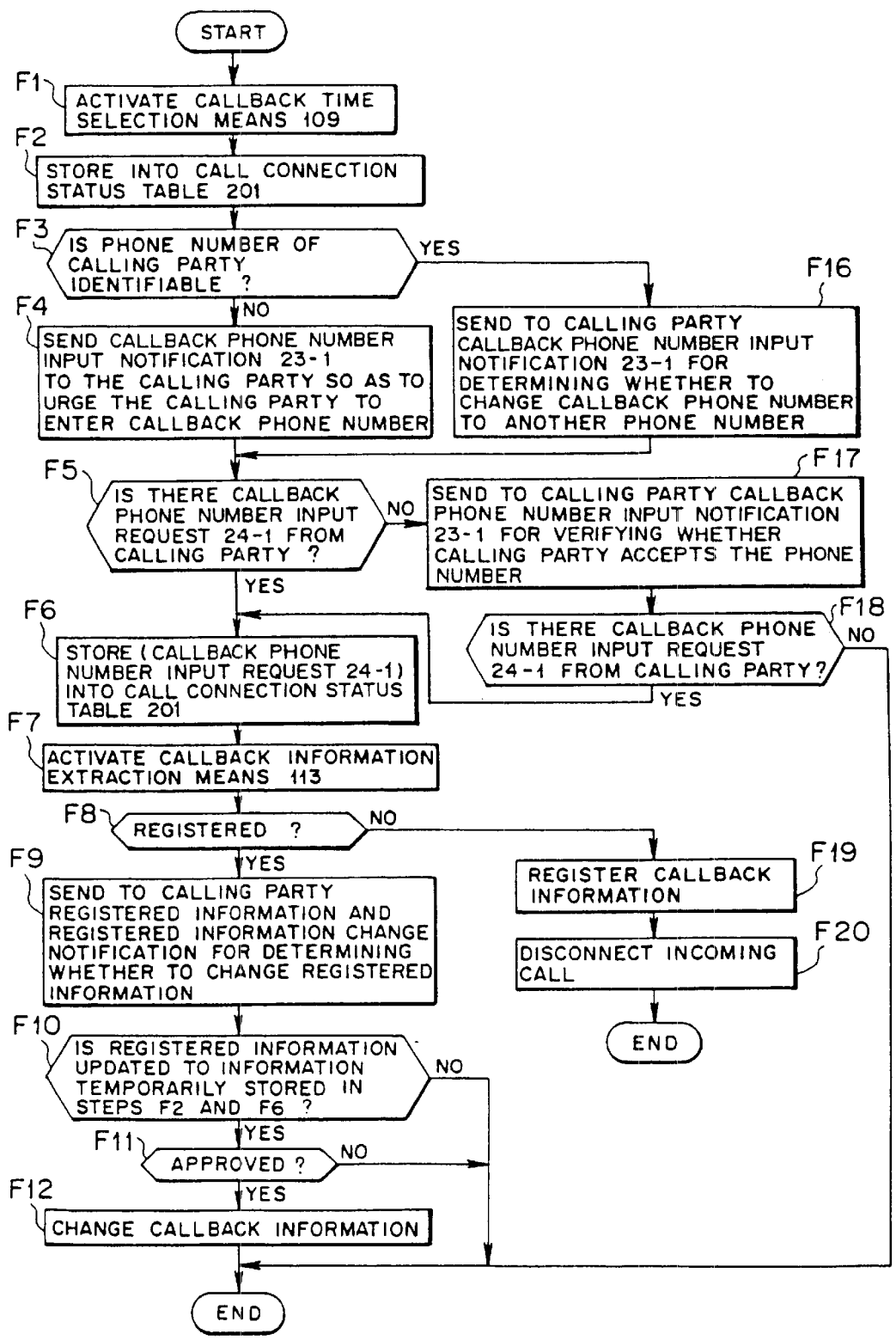
FIG. 17 is a flowchart for describing the function of callback phone number registration means.

When the client terminal 17a has failed to connect with the operator terminal, the callback registration means 107 in step B5 registers the phone number of the client terminal 17a and a callback time. In order to cause an operator terminal to call back the calling party, the callback registration means 107 registers callback information, such as the phone number of the client terminal and a callback time, into the tables within the storage device 11c. FIG. 17 shows a flowchart for the callback registration means 107.

First, the callback registration means 107 activates the callback time selection means 109 (step F1) in order to obtain a callback time. The callback time thus obtained is written into the call connection status table 201 (step F2). In this case, contrasted with a method, such as that which will be described later, under which the client terminal 17a determines a callback time, the electronic exchanger 11 determines a callback time.

Next, the callback registration means 107 directly determines whether the calling number of the client terminal 17a is identifiable, in order to obtain the phone number of the client(step F3). If the calling number is identifiable, the client terminal 17a receives an announcement stating that "The line is very busy now. We will call you back at a later time. If you desire to receive a callback on a phone other than the one currently being used, please enter a callback phone number" (the callback phone number input notification 23-1) (step F16).

In this state, if the client terminal 17a sends the callback phone number input request 24-1 stating that a callback to another phone number is desired (step F5), the callback registration means 107 temporarily stores the thus-received phone number (step F6) The callback information extraction means 113 is activated to retrieve the phone number in order to determine whether or not the phone number has already been registered in the operator terminal (step F7).

The callback information extraction means 113 determines whether or not the phone number is newly registered.

If the phone number is not previously registered (step F8), the callback information extraction means 113 writes the phone number into the callback information registration table 202 as newly registered information (step F19) and disconnects the incoming call (step F20).

In contrast, if the callback registration means 107 cannot identify the calling number of the client terminal 17*a* in step F3, the client terminal 17*a* receives an announcement stating that "The line is very busy now. Please enter a callback phone number so that we may call you back at a later time" (the callback phone number input notification 23-1) (step F4). The callback registration means 107 waits for entry of a phone number. If a phone number is not entered by way of the client terminal 17*a* (step F5), the callback registration means 107 sends a notification of confirmation to the client terminal (step F17). If the callback phone number input request 24-1 is not returned from the client terminal 17*a* (step F18), a callback phone number is not obtained. Therefore, the client terminal 17*a* is not called back.

Steps F9 to F12 in FIG. 17 represent processing required for the case where the phone number has already been registered, and an explanation will be given of the processing later.

A callback time and the client phone number are registered in the operator terminal in the manner as mentioned above, and a callback is made.

The callback means 108 makes a callback only when an operator terminal which can answer is available, and is incessantly and cyclically activated by means of a timer. More specifically, every time the callback means 108 is activated, the callback means 108 monitors whether or not there exists a call whose callback time has already passed. If there exists a call which requires a callback and an operator terminal is available, the client terminal 17*a* is automatically connected to the operator terminal through use of the phone number and the callback time registered in the callback information registration table 202.

Figure 18:
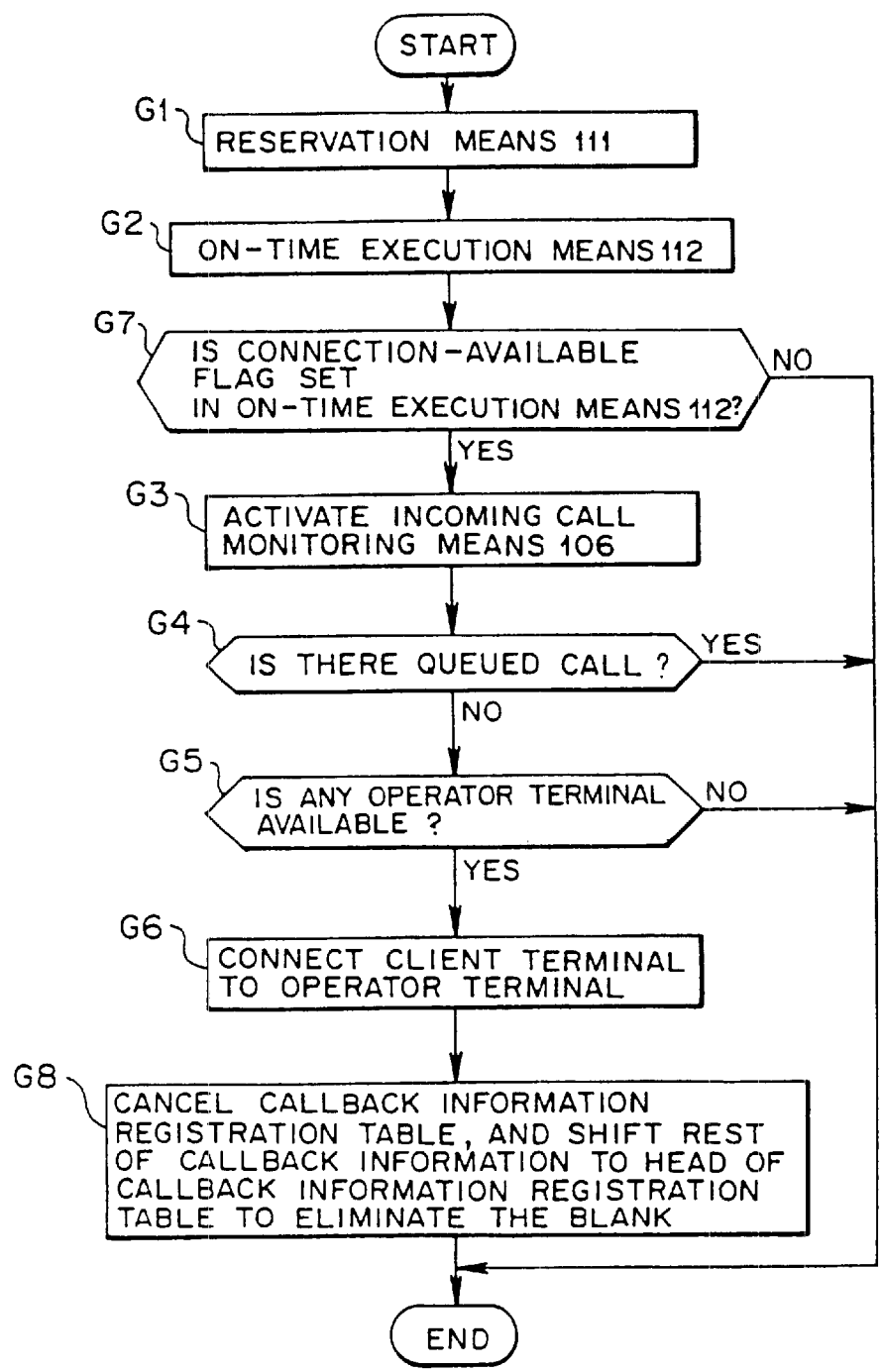
FIG. 18 is a flowchart for describing the function of callback means.

FIG. 18 shows a flowchart for the callback means 108.

First, the reservation means 111 is activated in order to determine whether or not a callback time has been reached (step G1), and the on-time execution means 112 is activated to determine whether or not an operator terminal is available (step G2).

Figure 19:
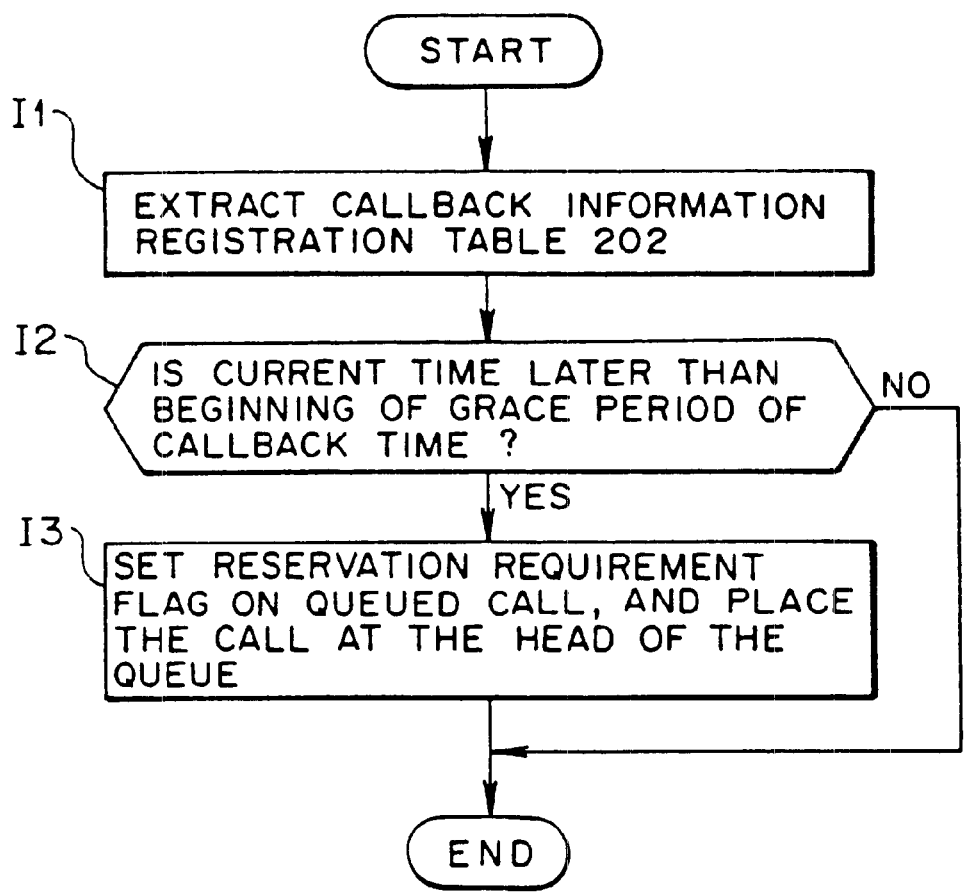
FIG. 19 is a flowchart for describing the function of reservation means.

FIG. 19 shows a flowchart for the reservation means 111.

The reservation means 111 extracts a callback time from the callback information registration table 202 (step I1). If data are entered at the top of the callback information registration table 202 and determination as to whether or not the current time is approaching the callback time (step I2) shows that the current time has passed the callback time, the reservation means 111 sets a reservation requirement flag on the queued call, thereby placing the call at the head of the queue section 210 (step I3).

In step G2 shown in FIG. 18, the callback means 108 activates the on-time execution means 112.

Figure 20:
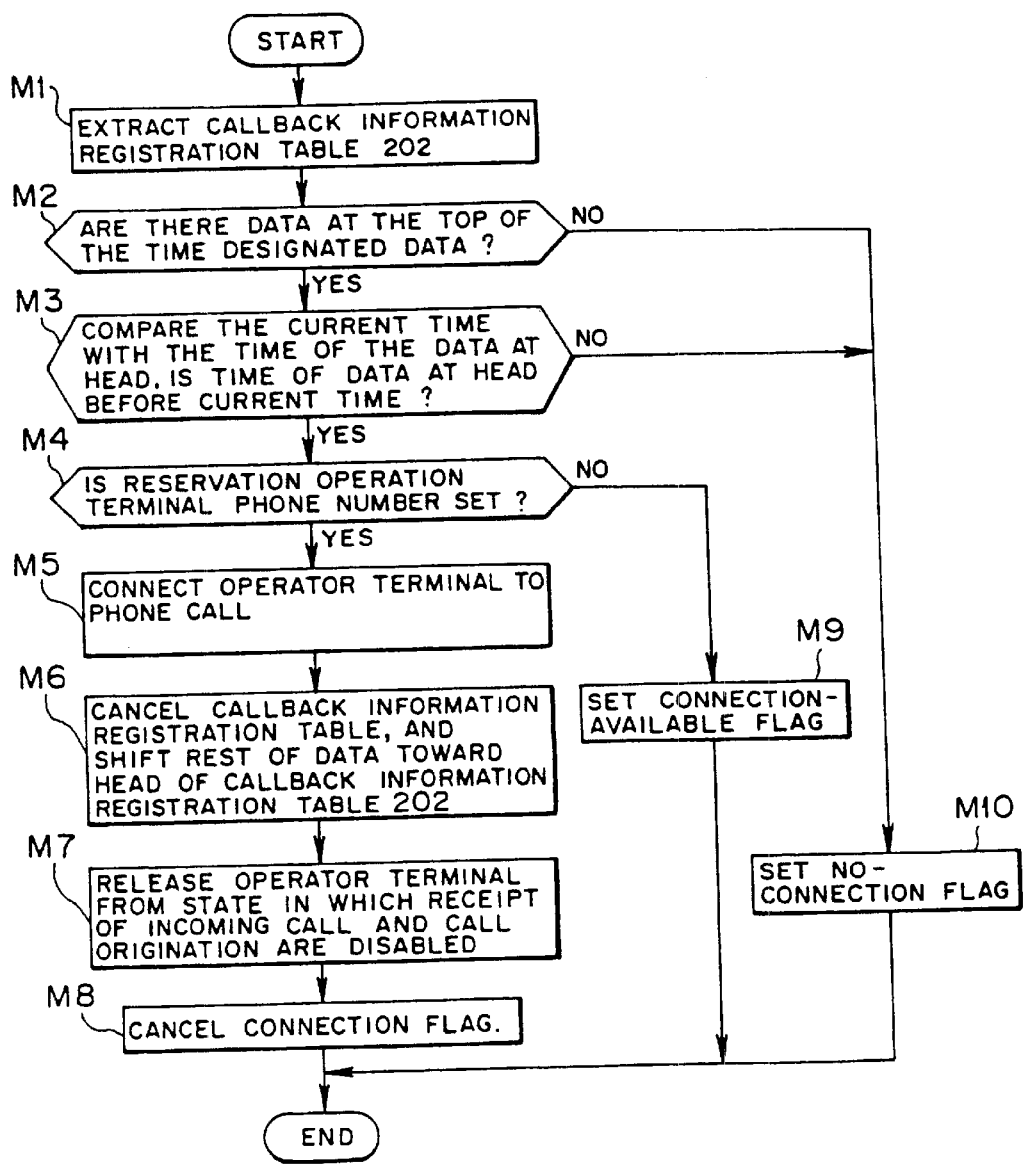
FIG. 20 is a flowchart for describing the function of on-time execution means.

FIG. 20 shows a flowchart for the on-time execution means 112. The on-time execution means 112 refers to the data at the top of the callback information registration table 202 (step M1). When three conditions are satisfied; namely, data are provided at the top of the table (step M2), the current time has passed the callback time (step M3), and the phone number of the operator terminal is not reserved, the on-time execution means 112 sets on a connection-available flag (step M9). The on-time execution means 112 waits until one of the operator terminals becomes unoccupied, thereby entering an ordinary callback wait state.

The connection-available flag is intended to inform the main control means 50 of an operator terminal being needed for the purpose of making a callback. Three types of information items are necessary for making a callback; namely, BKCDN (the phone number of the client), BKTIME (a callback time), and BKDN (the dial or phone number of the operator terminal reserved). In this case, the last information BKDN is not yet completed. Therefore, a reservation phone number (the phone number of the operator terminal reserved) connection-available flag is set, thereby declaring the need for an operator terminal.

By means of the connection-available flag or the previously-mentioned reservation requirement flag (which enables a determination as to whether or not there still remains a call requiring a callback, by reference to whether or not the reservation requirement flag is set), the status of the operator terminal is made clear to the main control means 50.

If the phone number of the operator terminal reserved is set in step M4 shown in FIG. 20, the on-time execution means 112 connects the reserved operator terminal of the phone number with the client terminal 17*a* (step M5). Thereafter, the on-time execution means 112 retrieves the callback information registration table 202 (step M6) and releases the operator terminal from an incoming call disabled and call origination disabled state (step M7), thereby clearing the connection-available flag (step M8).

In step G7 shown in FIG. 18, the on-time execution means 112 determines whether or not a connection-available flag is set. If the callback means 108 resumes control and call connection is continued, the incoming call monitoring means 106 is activated (step G3).

The incoming call monitoring means 106 determines whether or not any call is queued in the queue section 210 (step G4) and whether or not an operator terminal (step G5) is available. Only when an operator terminal is available, the callback means 108 dials the phone number recorded in the callback information registration table 202 (step G6) and deletes one data set at the head of the callback information registration table 202. In order to eliminate the blank space, the rest of the data are shifted toward the top of the callback information registration table 202 (step G8).

In this way, at a scheduled time a callback is made to the calling party of the call which could not be answered at the time of arrival.

Figure 30:
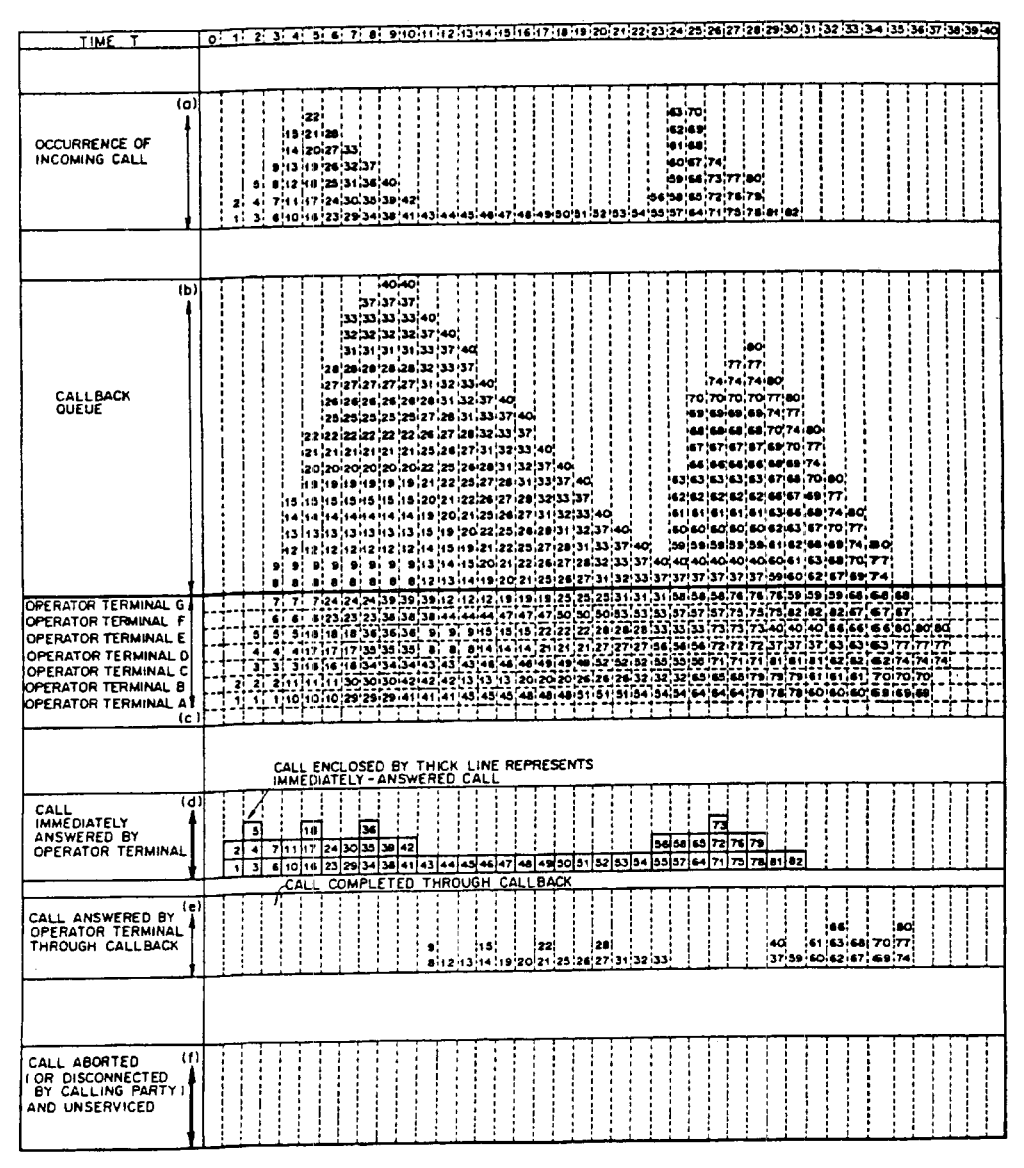

FIG. 30 is a model chart showing the relationship between the incoming call made to the ACD service and the answers by the operator terminals. FIG. 30 shows the result of simulation of the present embodiment in which the operator terminals answer an incoming call according to the following model.

In this model, if an operator terminal is available when an incoming call arrives, the operator terminal talks with the calling party of the incoming call. In contrast, if no operator terminal is available, i.e., if the boxes associated with the respective operator terminals provided in the "Operator terminals A to G" section are already filled in, the incoming call is temporarily disconnected in order to release the telephone line and is queued in the queue section 210 for callback purpose. If any one of the operator terminals becomes available, an incoming call arriving at that moment is answered in preference to the call already stored in the callback queue.

The details of the model will now be described hereinbelow. Numerals provided in individual columns shown in FIG. 30 represent the calls received from the clients.

The operator terminal talks with the client under the following conditions. The duration of one call corresponds to three segments of time T. For example, in the model chart shown in FIG. 30, call 1 received at time T1 can be answered by the operator terminal A at time T1, so that the calling party of the call 1 talks with the operator A. This is represented by numeral 1 written in the block defined by the row of the operator terminal A and the column of time T=1 in the "Operator terminals A to G" section. From time T=1 to T=3, the calling party of the call 1 talks with the operator terminal A. This is represented by numeral 1 written in the block defined by the row of the operator terminal A and the columns of T=1 to T=3.

If no operator terminal is available when an incoming call is received, the incoming call is temporarily disconnected to release the telephone line and is queued into the callback queue.

For example, when call 15 is received at time T=4, no operator terminal is available. Therefore, the call 15 is temporarily disconnected, and the information required for calling back the calling party of the call 15 is stored in the callback queue. This is represented by numeral 15 written into the column of T=4 in the "Callback Queue" section. Further, a numeral representing a call is written into a column of time in a "Callback Queue" section by the time the operator terminal calls back the calling party, that is, the calls are waiting in the callback queue.

In practice, the calls waiting in the callback queue are not queued while using the telephone line; the calling parties of the queued calls are waiting for callbacks from the operator terminals. Therefore, even if the calls are waiting in the queue for a long period of time, they are not aborted.

When any one of the operator terminals becomes available, the operator terminal services an incoming call received at this moment in preference to the incoming call that has been waiting in the callback queue in the queue section 210. For example, the operator terminals A to B become available at time T=4, and these operator terminals A and B answer incoming calls 10 and 11 which are received by the ACD system at this time. Calls 8 and 9 which have been waiting in the callback queue in the queue section 210 continue to wait.

From the model chart shown in FIG. 30, the following three items (3-1) to (3-3) are understood. (3-1) As can be seen from the numerals provided in the "Call aborted (or disconnected by the calling party) and unserviced" section, there are no unserviced calls, and all the incoming calls can be serviced. (3-2) As can be seen from the numerals provided in the "Call immediately answered by the operator terminal" section, 50 calls, accounting for about 61% of all incoming calls (82 calls), are answered immediately by the operator terminal without wait. (3-3) As can be seen from the numerals provided in the "Call answered by the operator terminal through callback" section, 32 calls, accounting for about 39% of all the incoming calls (82 calls), are answered by way of callback from the operator terminals at a later time.

In the ACD service to which the present invention is applied, it is understood that unserviced calls are eliminated and that the number of calls answered immediately increases greatly.

The incoming call processing method is carried out in the following manner. First, the electronic exchanger 11 receives a call from the client terminal 17a, thereby executing the call incoming step. Next, the incoming call acceptance means 100 is activated and determines whether to answer the incoming call immediately or to callback the calling party of the incoming call at a later time at which the volume of incoming call traffic intensity is light, thereby executing the incoming call acceptance step. Further, the callback means 108 is activated so as to call back the calling party, thus executing the answer step.

As a result, the greatest possible number of incoming calls can be answered immediately without causing unserviced telephone calls, thereby yielding an advantage of the ability to expand opportunities for operators to establish communication with clients. Further, there is yielded an advantage of correct arrangement of operators, which in turn results in effective utilization of a telephone line and a reduction in operating costs.

An example of determination of a callback time will now be described.

In the previous example, the callback time is selected by the electronic exchanger 11. However, the client terminal 17a may also select a desired callback time.

Figure 21:
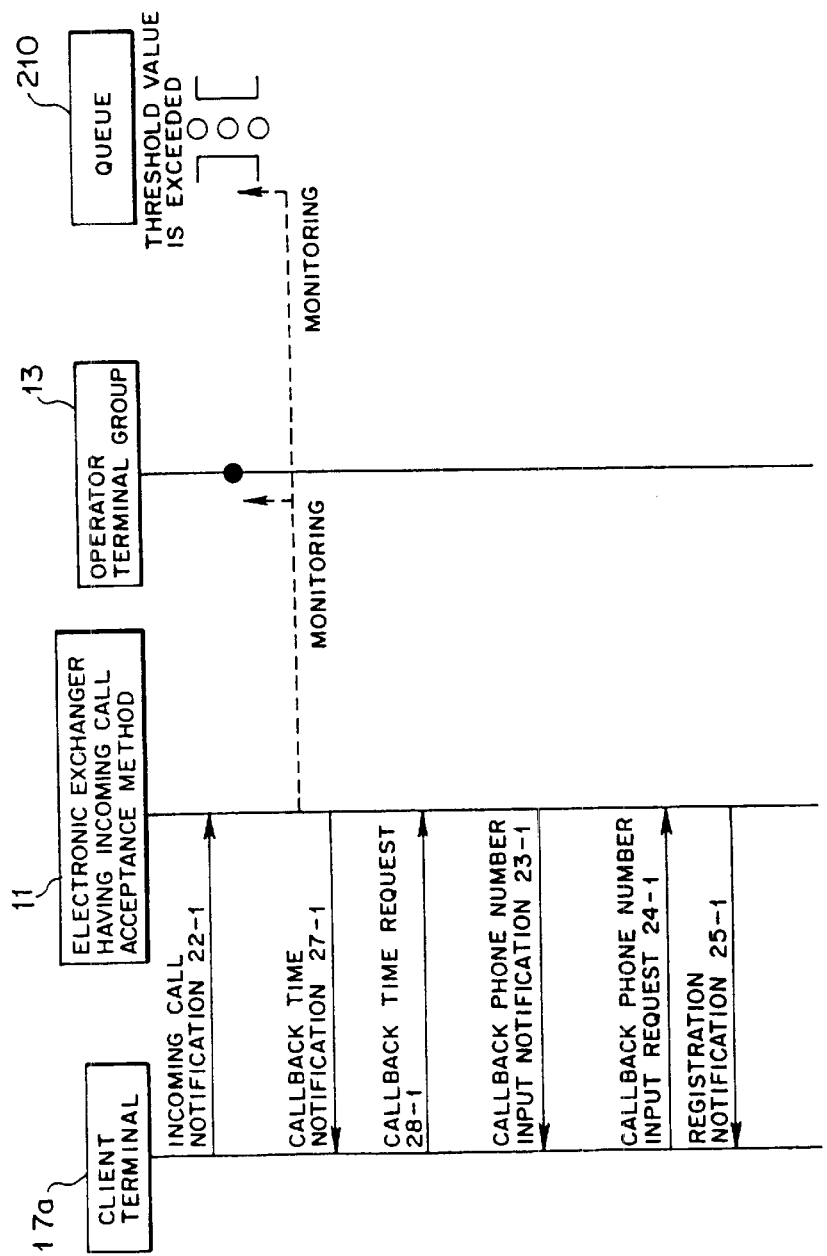
FIG. 21 is a diagram for describing a sequence of procedures to be performed between the client terminal and the exchanger from the time the ACD system receives an incoming call until the time a callback phone number is registered by reporting of a callback time to the calling party for approval.

FIG. 21 shows time registration sequence performed between the calling party and the electronic exchanger 11 from the time an incoming call is received by the ACD system until the time a callback for the incoming call is registered. The sequence shown in FIG. 21 represents that although the call is received by the electronic exchanger from the client terminal (incoming call notification 22-1), no serviceable operator is available, and the call is registered as a call requiring callback. Before sending to the client terminal 17a a message requesting a callback phone number, the main control means 50 refers to the conditions which are registered beforehand and are used for extracting a time period during which the volume of incoming call traffic intensity is light, thus selecting a possible callback time period. The thus-selected callback time period is reported to the client terminal 17a (a callback time notification 27-1). In this state, the callback time is not registered in the storage device 11c until the client terminal 17a sends a callback time request 28-1, so that the sequence of procedures becomes similar to that described in the previous example. In order to extract a time period during which the volume of incoming call traffic intensity is light, the main control means 50 modifies the statistical traffic intensity table 203 slightly.

With reference to flowcharts for individual sections, there will now be described in detail the operations of the main control means 50 required in the case where the operator terminal selects a possible callback time period, sends the time period to the client terminal 17a, and receives an approval of the time period from the client.

In a case where no operator terminal capable of answering the incoming call from the client terminal 17a is available, the incoming call is registered as a call requiring callback when a mean waiting time exceeds, e.g., three minutes. More specifically, the callback registration means 107 shown in FIG. 17 first activates the callback time selection means 109 (step F1 shown in FIG. 17). For example, if the current time is 8:10, the callback time selection means 109 searches across the table for a possible callback time after 8:30. The search is carried out on condition that the object-of-operation flag (OBJFLG) is in operation and that the acceptable traffic intensity (ALLOW) is greater than the predicted traffic intensity (PREDICT).

Figure 22:
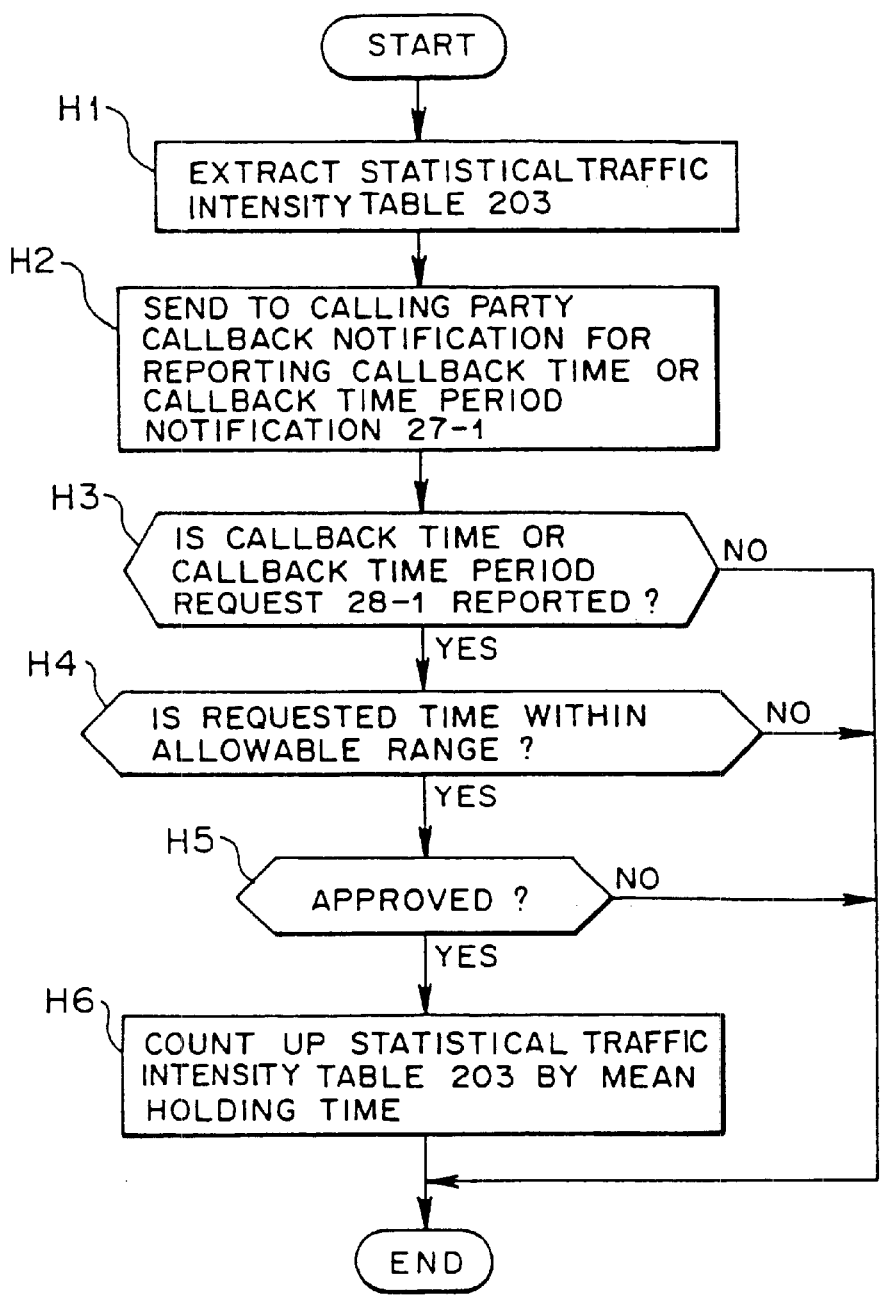
FIG. 22 is a flowchart for describing the function of callback time selection means.

FIG. 22 shows a flowchart for the callback time selection means 109.

In step H1 shown in FIG. 22, the callback time selection means 109 searches for relevant time periods after the current time during which the volume of incoming call traffic intensity is expected to be light, from the statistical traffic intensity table 203. For example, if a possible callback time for the incoming call received at 8:10 is searched under the foregoing condition, a time period from 9:00 to 9:29 is extracted. The callback time selection means 109 reports to the client terminal 17a a message (the callback time notification 27-1) stating that "We will call you back at 9 o'clock. If this is acceptable, please press 0#. If this is not acceptable, please press 1#" (step H2). In a case where the callback time request 28-1 is received from the client terminal 17a (step H3), the callback time selection means 109 determines whether or not the time designated by the client falls within the allowable time period (step H4). If the time is found to fall within the range of the time period and an approval message is received from the client terminal 17a (step H5), the callback time selection means 109 counts up the statistical traffic intensity table 203 by a mean holding time (step H6), thereby determining a callback time. The mean holding time signifies the number of calling parties which can be serviced within each time period.

As shown in FIG. 21, after determination of the callback time, the main control means 50 sends to the client terminal 17a a message (the callback phone number input notification 23-1) for urging the calling party to enter a callback phone number. After receipt of an answer (the callback phone number input request 24-1), the calling party is called back in the same manner as in the previous example. More specifically, the main control means 50 incessantly activates the callback means 108 shown in FIG. 18 at regular intervals. In step G1 shown in FIG. 18, the callback means 108 monitors whether or not the current time is later than the callback time, through use of the reservation means 111. If the current time is later than the callback time, the reservation means 111 sets a reservation requirement flag on the queued call in step I3 shown in FIG. 19 and places the queued call at the head of the queue section 210. The callback means 108 shown in FIG. 18 resumes control, and control is then handed over to the on-time execution means 112 in step G2. In step M1 shown in FIG. 20, the on-time execution means 112 refers to the data at the top of the callback information registration table 202. If data exist(step M2), a connection-available flag is set (step M9) on condition that the current time is later than the callback time (step M3) and that the phone number of the reserved operator terminal is not set (step M4).

In a case where the processing has proceeded beyond the processing of the on-time execution means 112 and that the connection-available flag is set (step G7 shown in FIG. 18), the callback means 108 activates the incoming call monitoring means 106 (step G3). If an operator terminal is available (steps G4 and G5), the client terminal 17a is automatically connected to an available operator terminal (step G6) thereby canceling the callback information registration table 202 and shifting the rest of the data to the head of the callback information registration table 202 so as to fill the blank (step G8).

The incoming call processing method is performed in such a manner as described above. More specifically, the callback time selection means 109 selects a callback time, thereby executing the time information selection-and-determination step. The notification means 52 reports the thus-selected time to the calling party, thereby executing the first notification step. Next, the verification means 53 receives an approval for the time from the calling party, thereby executing the verification step. Further, the callback time selection means 109 approves the callback time and determines it to be callback time information, thereby executing the answer time determination step.

As a result, there can be eliminated dissatisfaction among the calling parties required to wait for answering by the operators. For example, in a case where the calling party is answered by means of a callback, the calling party is not required to wait by the phone, until the time of callback. Further, there is yielded an advantage of accomplishment of efficient operations by the operator terminal controlling the callback time for the client.

Moreover, calls can be distributed over the time periods at which the volume of incoming call traffic intensity is light, and reception business can be made more efficient.

In stead of a possible callback time being reported to the calling party, a plurality of time periods may be offered to the calling party so that he can select a desired time period.

Figure 23:
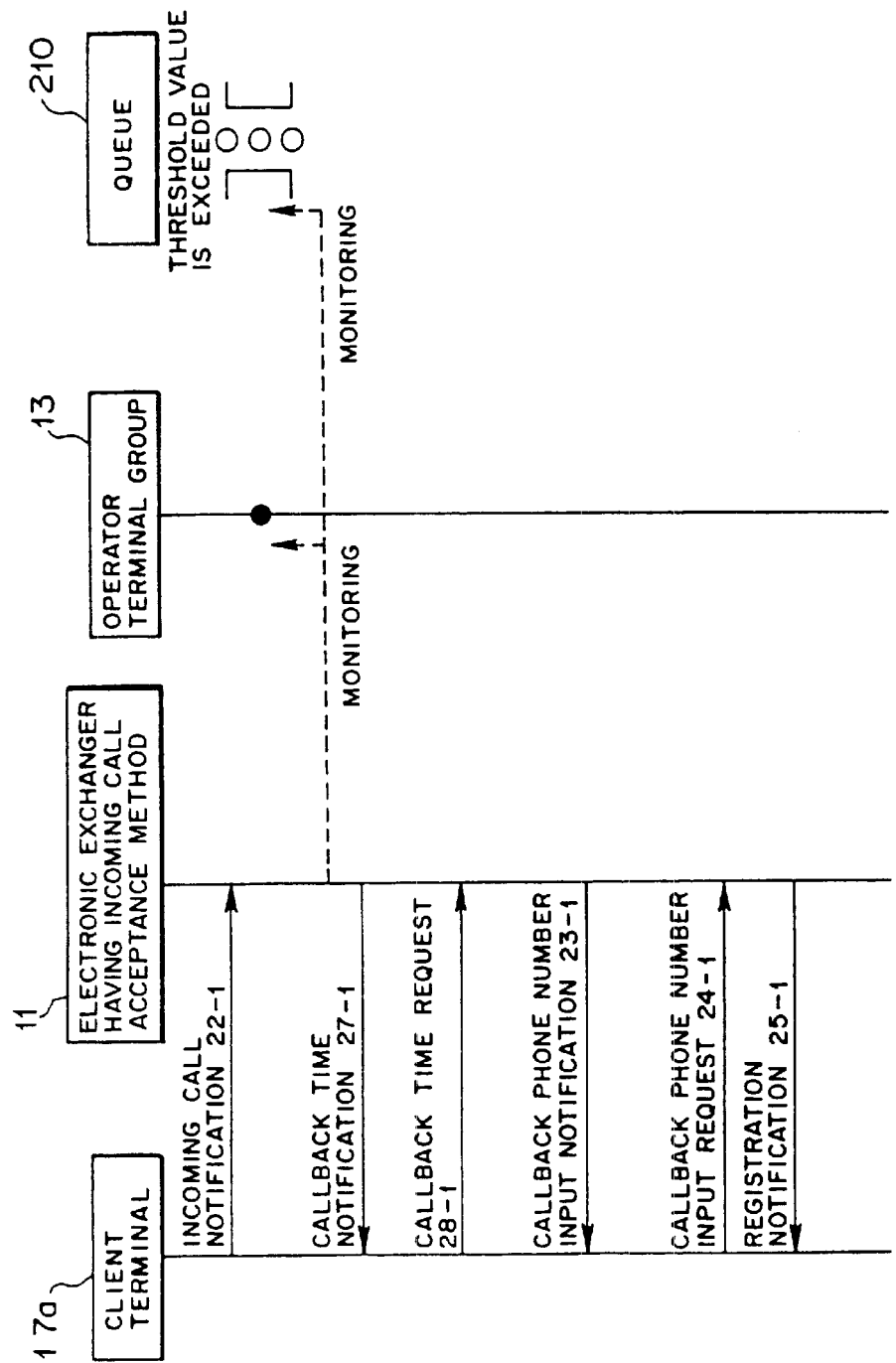
FIG. 23 is a diagram for describing a sequence of procedures to be performed between the client terminal and the exchanger from the time the ACD system receives an incoming call until the time a callback phone number is registered by reporting of a callback time zone and a callback time to the calling party for approval.

FIG. 23 shows a sequence of procedures performed between the calling party and the electronic exchanger 11 from the time an incoming call is received by the ACD system until the time the incoming call is registered as a call requiring callback. In the sequence of procedures shown in FIG. 23, the callback time notification 27-1 is reported to the calling party from the electronic exchanger 11, wherein time period data in the callback time notification 27-1 include not one time value but including a plurality of time periods, e.g., four time periods.

The processing returns to step H1 shown in FIG. 22, where, if the current time is 8:10, the callback time selection means 109 searches across the table after 8:30 and extracts, as time periods at which the volume of traffic intensity is expected to be light, four time periods 9:00 to 9:29, 9:30 to 9:59, 10:00 to 10:29, and 10:30 to 10:59. These four time periods are reported to the client terminal 17a. When searching for callback times from the time period after the current time, the callback time selection means 109 refers to various conditions for extracting a plurality of time periods from the time periods which are registered beforehand and during which the volume of incoming call traffic intensity is expected to be light and transmits a message stating that "We will call you back during a time from 9:00 to 11:00. If this is acceptable, please enter a desired time period in four digits. If this is not acceptable, please press #" (step H2).

The client terminal 17a designates a desired time period from the submitted time period from 9:00 to 11:00. If 10:30 is desirable, 1030 is entered, so that the callback time request 28-1 is returned to the electronic exchanger 11 (step H3). Upon receipt of the message 28-1 from the client terminal 17a, the electronic exchanger 11 checks whether or not the time period designated by the client falls within the allowable time range (step H4). If the electronic exchanger 11 receives an approval (step H5), the statistical traffic intensity table 203 is counted up by a mean holding time (step H6). The callback time period is temporarily stored in the call connection status table 201 (step F2 shown in FIG. 17).

Step F2 is followed by callback processing similar to that performed in the previous example.

The incoming call processing method is executed in the manner mentioned above. More specifically, the callback time selection means 109 selects and determines a time period during which the operator terminals can answer, thereby executing the time information selection-and-determination step. The notification means 52 reports the time period to the calling party, thereby executing the first notification step. Next, the calling party designates a desired time within the answer time period determined in the time information selection-and-determination step, thereby executing the answer time designation step. The verification means 53 verifies the time designated by the calling party, thereby executing the verification step.

Accordingly, there is yielded an advantage of enabling the calling party to select a desired answer time. Further, since the client's desire is taken into consideration, the quality of the service is improved.

An explanation will now be given of a method of reserving an operator terminal for callback purpose at a callback time.

In order to callback the calling party of the incoming call that is selected to be answered at a later time, an operator terminal must be reserved for callback purpose at the callback time. To this end, the main control means 50 selects and reserves an operator terminal if an operator terminal is available. Further, the main control means 50 performs dynamic operations so as to prevent the thus-reserved operator terminal from receiving or originating a call just before the callback is completed.

The flow of reservation of an operator terminal for callback purpose will be described in detail according to flowcharts for individual means.

The main control means 50 incessantly and cyclically activates callback means 108. In step G1 shown in FIG. 18, the callback means 108 calls up the reservation means 111. In step I1 shown in FIG. 19, the reservation means 111 extracts the callback information registration table 202 and checks for the presence or absence of data at the top of the callback information registration table 202, thereby determining whether or not the current time has reached a time determined by subtraction of a grace period from the callback time (step I2). If the current time has passed the grace period and the phone number of the operator terminal reserved is not yet set, the reservation means 111 sets a reservation requirement flag on the queued call of the ACD group 13 and places the queued call at the head of the queue section 210 (step I3).

In a state in which the reservation requirement flag is set on the queued call, there still remains a call which requires a callback. Therefore, the main control means 50 reserves one of the operator terminals and keeps the operator terminal reserved until the callback is completed.

Figure 24:
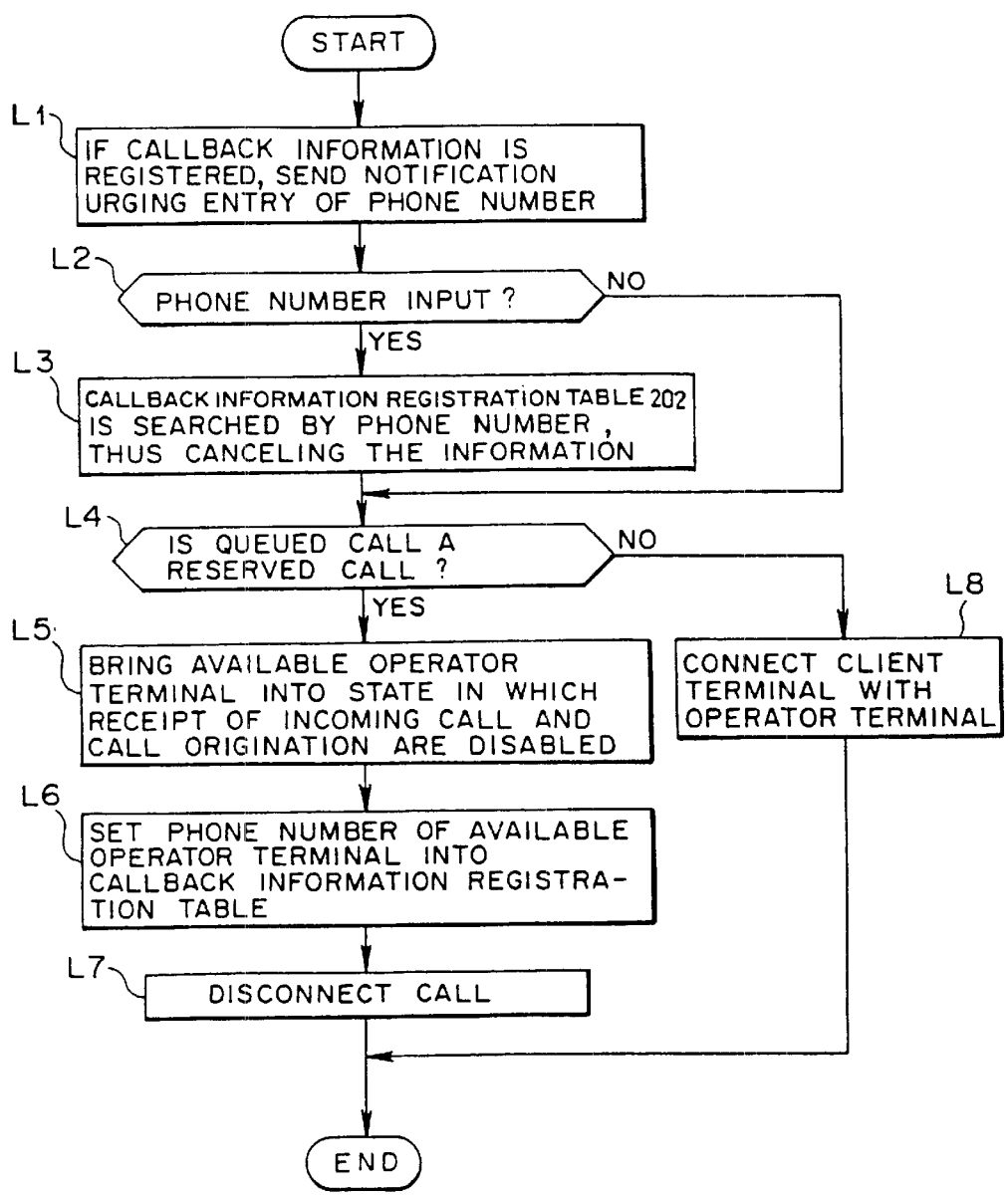
FIG. 24 is a flowchart for describing the function of connection processing means.

FIG. 24 shows a flowchart for connection processing means 115.

The connection processing means 115 is incessantly and cyclically activated by the main control means 50 and connects the client terminal with an operator terminal if an operator terminal is available. First, steps L1 to L3 constituting another subroutine, which will be described later, are bypassed, and step L4 shown in FIG. 24 is performed first. More specifically, if an operator terminal is available and the reservation requirement flag is set on the queued call (step L4), the connection processing means 115 renders the operator terminal which can answer unable to receive an incoming call for ACD service or to originate a call (step L5). The phone number of the operator terminal is searched from the top of the callback information registration table 202 and is changed to unset data (step L6). Further, the queued call associated with the operator terminal of the phone number is deleted (step L7).

In contrast, if the reservation requirement flag is not set on the queued call, the call is considered merely an incoming call. Therefore, the operator terminal reservation step is not carried out, and the connection processing means 115 connects the incoming call to the operator terminal (step L8).

In a state in which the operator terminal for callback purpose is reserved in such a way, an actual callback is carried out in the following manner:

The main control means 50 incessantly and cyclically activates the callback means 108 shown in FIG. 18. After the reservation means 111 has performed processing (step G1), the on-time execution means 112 is activated (step G2).

In step M1 shown in FIG. 20, the on-time execution means 112 refers to the callback information registration table 202. If data are present at the top of the time designated data (step M2), the on-time execution means 112 determines whether or not the current time is later than the callback time (step M3) If the phone number of the operator terminal for callback purpose is set (step M4), the operator terminal of the phone number is connected to the client terminal 17a (step M5). After connection of the operator terminal to the client terminal 17a, the on-time execution means 112 deletes one data set from the top of the callback information registration table 202 (step M6), thereby releasing the operator terminal from the state in which receipt of an incoming call for ACD service and call origination are disabled (step M7), thereby canceling the connection-available flag (step M8).

Unless the current time has reached the callback time in step M3, no processing is carried out, and the connection-available flag is canceled (step M10).

The incoming call processing method is carried out in this manner. More specifically, when the current time reaches the callback time, the main control means 50 reports that the reservation means 111 has reached the callback time, by setting a reservation requirement flag on the queued call. The connection processing means 115 monitors which of the operator terminals becomes unoccupied. If an operator terminal is available and the reservation requirement flag is set on the queued call, the operator terminal is prevented from receiving an incoming call for ACD service and originating a call, thereby executing the answer operator terminal selection step and the answer operator terminal reservation step. The calling party is called back at the time that has been approved by the calling party beforehand.

As a result, the incoming call can be inevitably answered at a designated time without deteriorating the availability factor of the operator terminal, thereby improving credibility in the eyes of the calling parties.

Although in the foregoing example retransmission of a call from the client terminal 17a is not taken into account, several retransmissions of a call from the client terminal 17a before the client terminal 17a is called back and after the incoming call has been registered is conceivable, as is often desired in the case of ticket reservation.

More specifically, if another call is received from the same calling party before the calling party is called back in response to the first incoming call, the callback information regarding the first incoming call is deleted to avoid wasteful callback, if the operator terminal can answer and finishes talking, thereby improving the availability factor of the operator terminals and the use efficiency of the telephone line.

Figure 25:
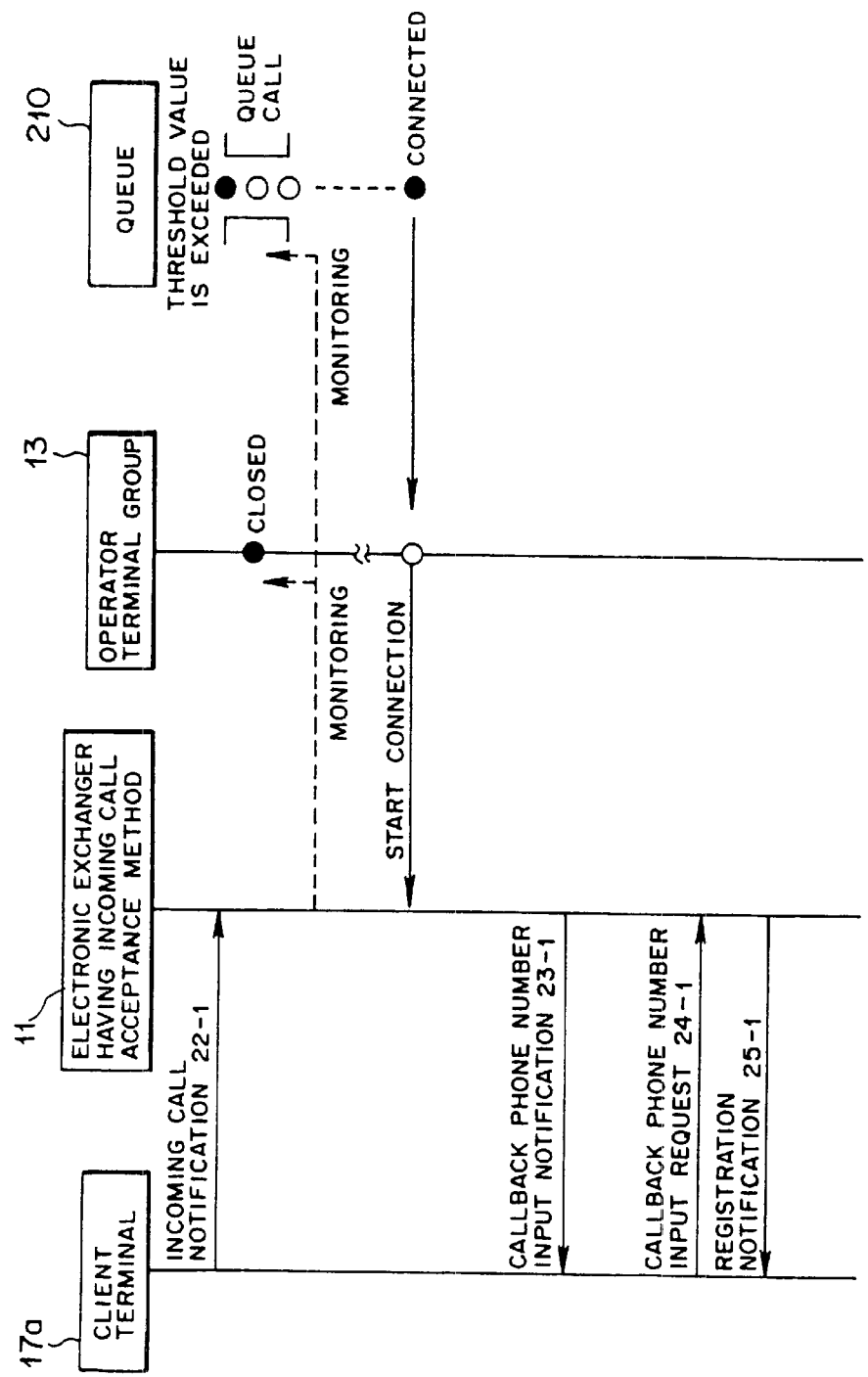
FIG. 25 is a diagram for describing a sequence of procedures to be performed between the client terminal and the exchanger from the time the ACD system receives an incoming call until the time callback information is cancelled.

FIG. 25 shows a sequence of procedure performed between the calling party and the electronic exchanger 11 at the time of retransmission of a call, from the time the ACD system receives an incoming call until the time the callback information is canceled.

The incoming call notification 22-1 shown in FIG. 25 is the first incoming call received by the electronic exchanger 11 from the client terminal 17a. Since the operator terminals are occupied, the first incoming call was queued in the queue section 210.

In this state, if the electronic exchanger 11 receives another call from the same client terminal 17a before the operator terminal calls back the client terminal 17a and if an operator terminal is available(as indicated by a circle provided below the operator terminal group 13 shown in FIG. 13), the callback information is retrieved. If the callback information is registered, the information is deleted before the second incoming call is connected to the operator terminal. In other words, the main control means 50 determines whether or not the answer postponement information regarding the client terminal 17*a* is registered. If the information is found to be registered, the main control means 50 sends an notification message (callback phone number input notification 23-1) urging entry of the registered phone number.

If the registered phone number (the callback phone number input request 24-1) is input from the client terminal 17*a*, the main control means 50 retrieves the answer postponement information through use of the phone number. If the answer postponement information is registered, the information is canceled, and a cancellation notification (registration notification 25-1) is transmitted. The main control means 50 then connects the client terminal 17*a* with the available operator terminal, thereby eliminating wasteful callback.

The flow of cancellation of answer postponement information at the time of receipt of the second incoming call will be described in detail according to flowcharts for individual sections.

If the ACD group 13 receives another call from the same client terminal 17*a* while the callback information regarding the client terminal 17*a* is registered, the incoming call acceptance means 100 shown in FIG. 12 is called up first. This incoming call acceptance means 100 activates the waiting time control means 102 shown in FIG. 16.

In step B1 shown in FIG. 16, the waiting time control means 102 activates the incoming call monitoring means 106. The incoming call monitoring means 106 finds an available operator terminal from the operator terminals 13-1 to 13-Q (step B2). If an operator terminal is available, the connection processing means 115 is activated, thereby establishing communication between the operator terminal and the client terminal 17*a* (step B9).

In step L1 shown in FIG. 24, the connection processing means 115 sends to the client terminal 17*a* a message for ascertaining whether or not the client terminal 17*a* has already registered callback information and for urging the calling party to enter the registered phone number if the phone number is already registered. In such a state, if the registered phone number is entered from the client terminal 17*a* (step L2), the connection processing means 115 retrieves callback information through use of the phone number. If the phone number has already been registered, the callback information regarding the phone number is cancelled (step L3). The queued call is determined not to be a reserved call (step L4) and the processing is terminated, because the client terminal 17*a* is in communication with the operator terminal (step L8).

The incoming call processing method is performed in the manner as mentioned above. More specifically, in a case where the first incoming call is selected so as to be answered at a later time in the incoming call acceptance step and where the second call is received from the same calling party before the calling party is called back in the answer step, the connection processing means 115 cancels the callback information regarding the calling party and the already-registered answer postponement information regarding the calling party, so long as an operator terminal is available and the operator terminal can finish talking. As a result, the answer postponement information cancellation step is performed.

As a result, credibility with regard to phone answering can be improved in the eyes of the calling parties. Further, an incoming call can be appropriately answered or connected, as necessary, and a client desire for a change can be satisfied.

In spite of these advantages, there may still arise a case where no operator terminals cannot answer an incoming call when they are occupied.

In such a case, instead of the call being answered at that moment, the call may be answered by updating the already-registered callback information regarding the call.

Figure 26:
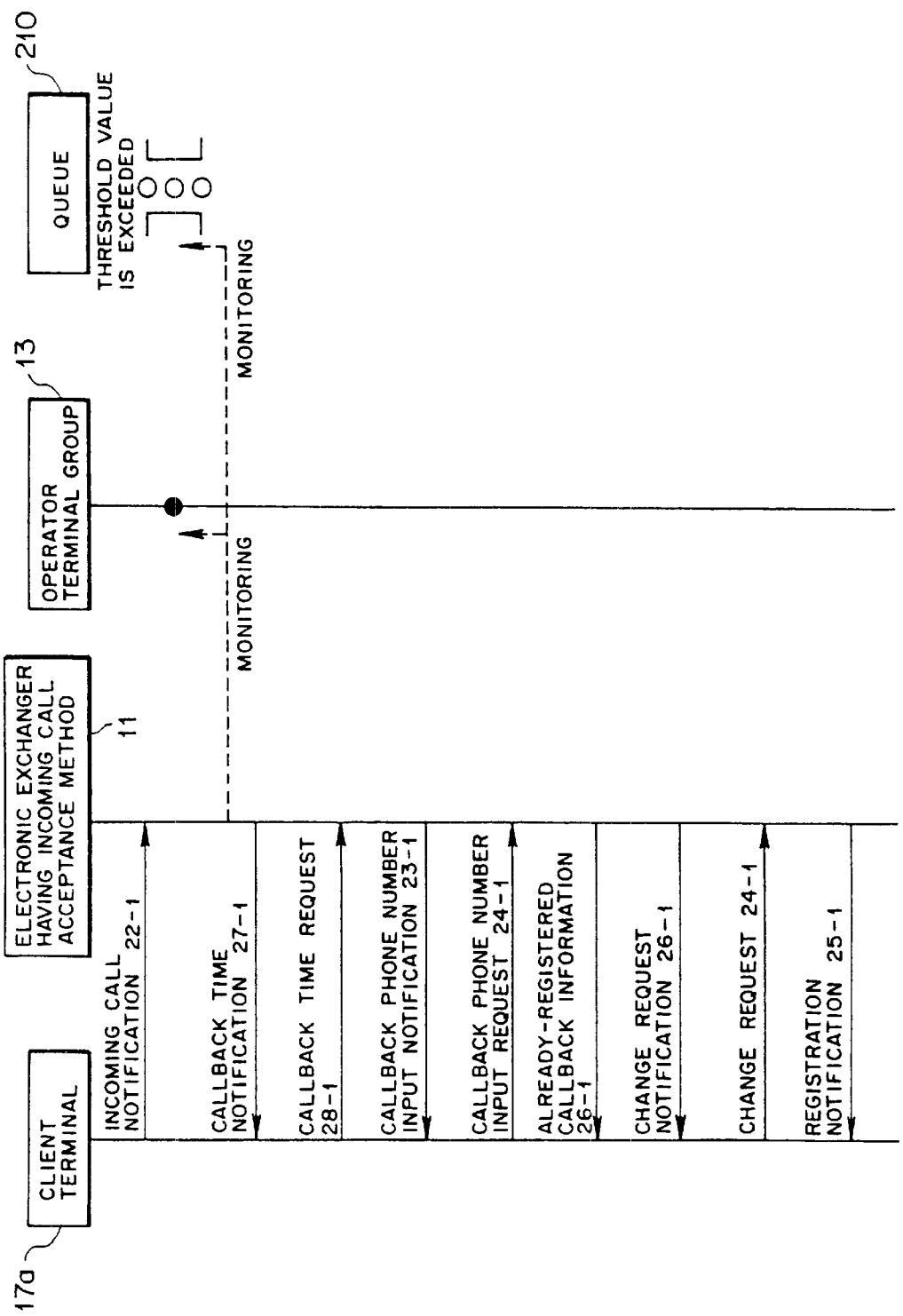
FIG. 26 is a diagram for describing a sequence of procedures to be performed between the client terminal and the exchanger from the time the ACD system receives an incoming call until the time callback information is changed.

FIG. 26 shows sequence of procedures which enables updating already-registered callback information and which is performed between the calling party and the electronic exchanger 11 from the time the ACD system receives an incoming call until the time the callback information regarding the incoming call is registered by means of the time period notification.

The incoming call notification 22-1 shown in FIG. 26 is the first call received by the electronic exchanger 11 from the client terminal 17*a*. Since the operator terminals are occupied, the first incoming call is queued in the queue section 210. In this state, if the electronic exchanger 11 receives another call from the same client terminal 17*a* before the operator terminal calls back the client terminal 17*a* and if again no operator terminal is available (as indicated by a solid circle provided below the operator terminal group 13 shown in FIG. 26), the main control means 50 sends to the client terminal 17*a* the message (the callback phone number input notification 23-1) urging the client to input a phone number which is to be registered for answering at a later time.

If the client terminal 17*a* returns the callback phone number input request 24-1 to the main control means 50, the main control means 50 retrieves the answer postponement information registered in the storage device 11*c* through use of the phone number. If the answer postponement information regarding the phone number is registered, the callback information change means 114 is activated.

The callback information change means 114 (not shown) inserts into a message to be shown (the already-registered callback information 26-1)the information obtained through retrieval of the already-registered callback information items and sends the message to be shown (change request notification 26-1) so as to ask the client terminal 17*a* whether to change the previously stored information. If a change request 24-1 is received from the client terminal 17*a*, the callback information change means 114 writes the information obtained through retrieval on the information already registered in the storage device 11*c*.

The flow of updating of answer postponement information at the time of occurrence of the second incoming call will now be described in detail according to flowcharts for individual sections.

When the ACD group 13 receives the second call from the identical client terminal 17*a* while the callback information regarding the client terminal 17*a* is already registered, the incoming call acceptance means 100 shown in FIG. 12 is called up. The incoming call acceptance means 100 activates the waiting time control means 102 shown in FIG. 16. The waiting time control means 102 in turn activates the incoming call monitoring means 106 in step B1 shown in FIG. 16, thereby determining which of the operator terminals 13-1 to 13-Q is available. If no operator terminal is available (step B2) and the mean waiting time exceeds the threshold value (step B3), the waiting time control means 102 retrieves another callback condition (step B4), thereby activating the callback registration means 107 (step B5).

In step F1 shown in FIG. 17, the callback registration means 107 activates the callback time selection means 109 first. The callback time selection means 109 extracts a callback time, and the thus-extracted callback time is temporarily stored in the call connection status table 201 (step F2). In order to acquire the phone number of the calling party, the callback registration means 107 determines whether or not the calling number of the calling party is identifiable (step F3) and sends to the client terminal a message offering the calling party an opportunity to change the phone number (step F16). If the calling number is not identifiable, the callback registration means 107 sends to the client terminal 17a a callback phone number input designation notification urging the calling party to enter a callback phone number (step F4).

If the callback phone number input request 24-1 is sent from the client terminal 17a (step F5), the callback registration means 107 stores the details of the message into the connection status table 201 (step F6) and activates the callback information extraction means 113 (step F7).

The callback information extraction means 113 retrieves the callback information across the callback information registration table 202 through use of the phone number and reports the registered callback information. If the callback information is registered (step F8), a registered information change notification for determining whether to change the callback phone number to another phone number is sent to the calling party (step F9). In step F6, the calling party is asked whether to change the callback phone number to the information temporarily stored in the call connection status table 201 (step F10).

If the approval for changing the callback phone number is received from the client terminal 17a (step F11), the callback registration means 107 causes the answer information storage means 51 to write the temporarily-stored information on the callback information registration table 202 (step F12).

The incoming call processing method is performed in the manner as mentioned above. More specifically, in a case where another incoming call from the same calling party arrives before the operator terminal answers the incoming call that has been selected in the incoming call acceptance step to be answered at a later time, if no operator terminal is available, the callback information extraction means 113 sends to the calling party, by way of the notification means 52, a registered information change notification for determining whether or not the callback phone number is to be changed to another phone number, thereby executing the answer postponement information cancellation step.

As a result, the greatest possible number of incoming calls can be answered immediately without involving unserviced phone calls, thereby expanding opportunities for operators to establish communication with clients. Further, operators can be arranged correctly, thus resulting in effective utilization of a telephone line and a reduction in operating costs.

(B) Other

Other than the foregoing embodiment, various modifications of the present invention are conceivable within the scope of the invention.

For instance, the present invention can be worked by changing the callback condition. Although according to the present invention a callback is made on the basis of a waiting time, the callback may be made under another condition. More specifically, requirement input control means 103 causes the calling party to determine whether to require a callback by means of a direct input. Calling party information control means 104 causes the calling party to determine whether to require a callback through use of the phone number of the calling party. Incoming call information control means 105 causes the calling party to determine whether to require a callback through use of the phone number of an incoming call.

Figure 27:
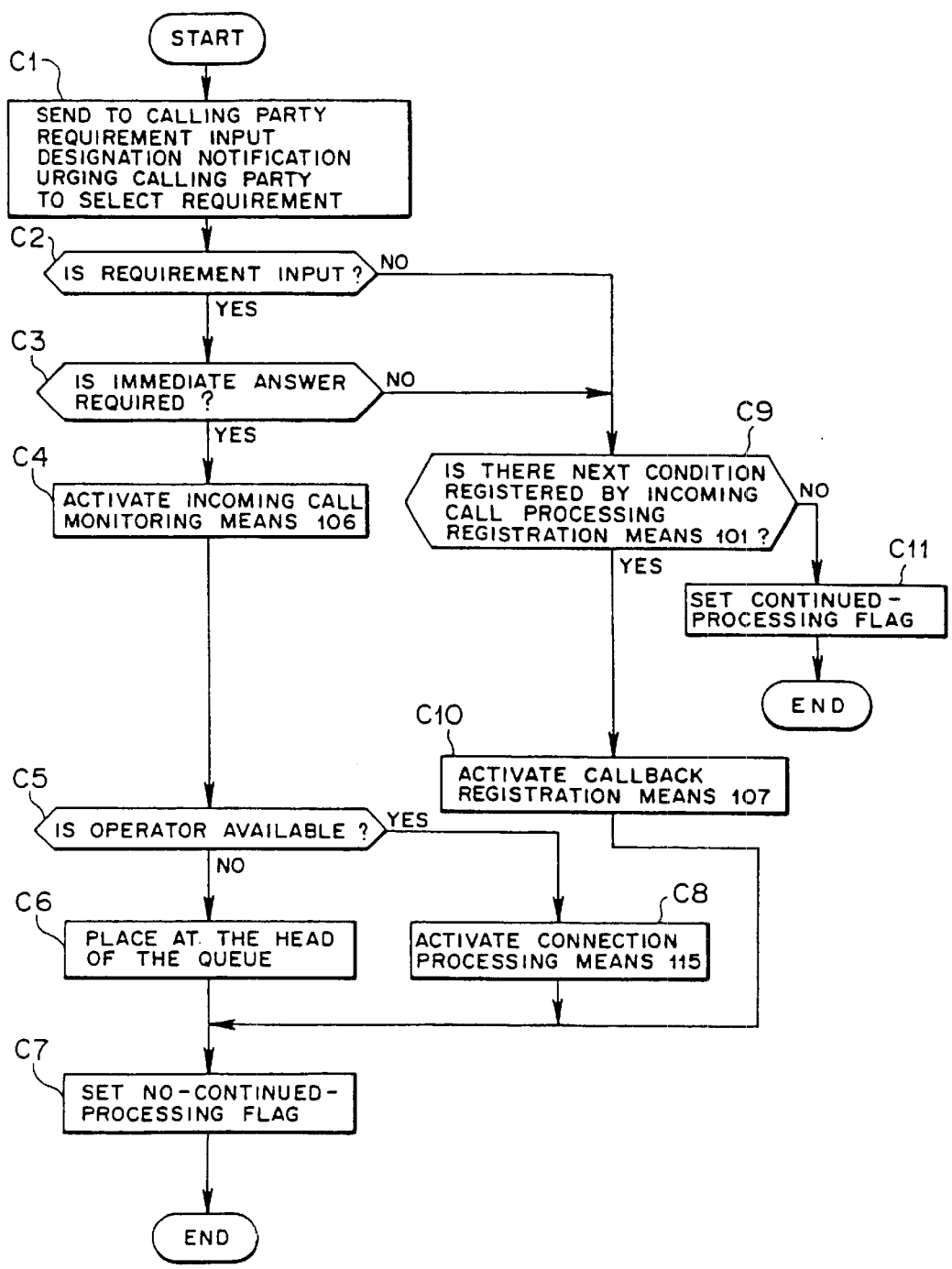
FIG. 27 is a flowchart for describing the function of requirement input means.

FIG. 27 shows a flowchart for the requirement input control means 103. In step C1 shown in FIG. 27, the requirement input control means 103 causes the operator terminal to urge the calling party to enter requirements. If a requirement is input (in step C2), the requirement input control means 103 determines whether or not the requirements represent an immediate answer (in step C3). If the requirements represent an immediate answer, the incoming call monitoring means 106 is activated (step C4), thereby finding an available operator terminal (step C5). If an operator terminal is available, the requirement input control means 103 activates the connection processing means 115 (step C8), thereby clearing the connection flag (step C7). In contrast, if no available operator terminal is available, the requirement input control means 103 places the queued call at the head of the queue section 210 (step C6). If the calling party does not input any requirement selection, the requirement input control means 103 retrieves another callback condition (step C9). If another callback condition exists, the callback registration means 107 is activated (step C10). If no other callback condition exists, a connection processing flag is set on (step C11), and the processing is completed.

Figure 28:
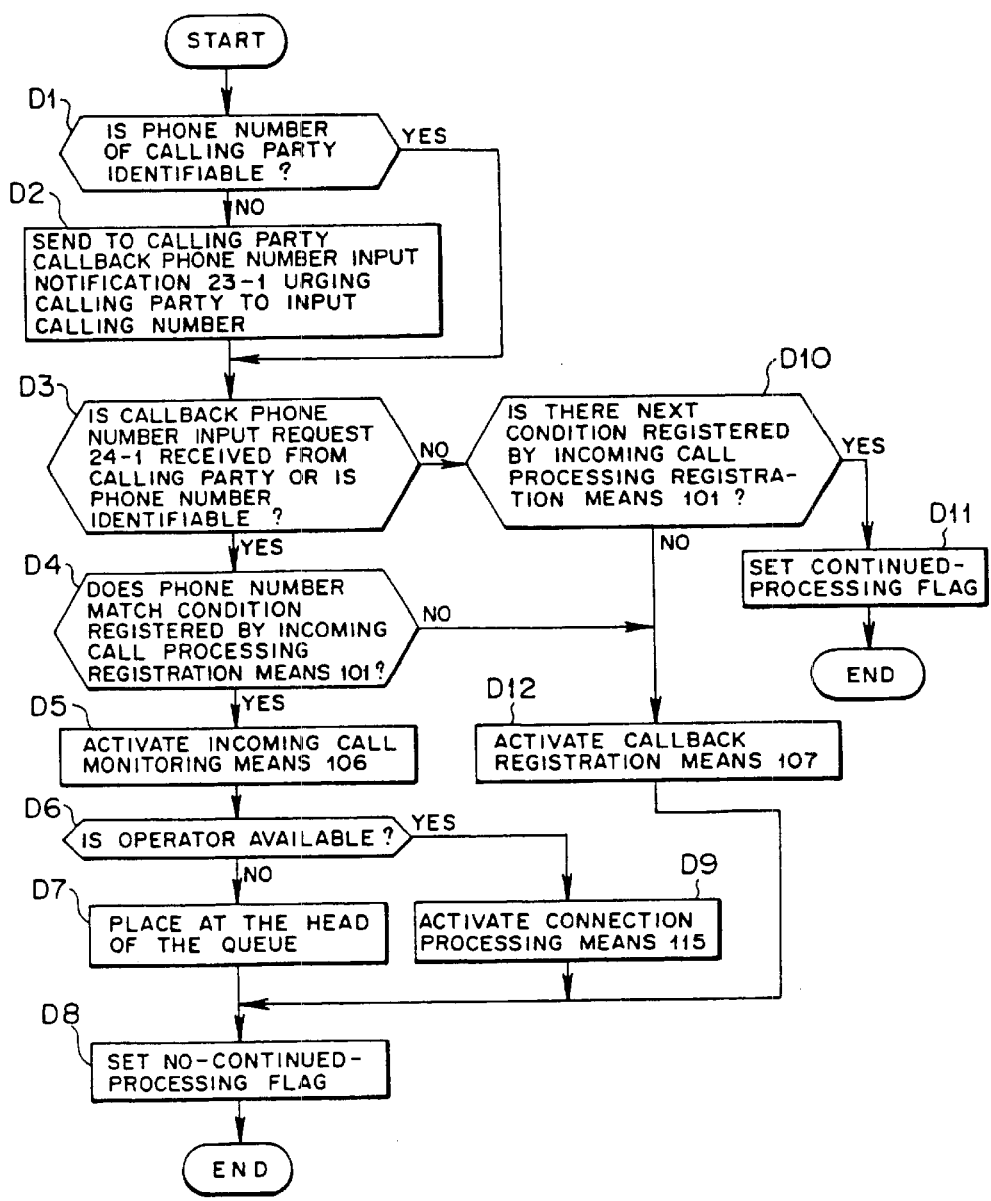
FIG. 28 is a flowchart for describing the function of calling party information control means.

FIG. 28 shows a flowchart for the calling party information control means 104. In step D1 shown in FIG. 28, the calling party information control means 104 reads the calling number of an incoming call by means of the operator terminal. If the calling number is unidentifiable, the calling party information control means 104 urges the calling part to enter the phone number (step D2). The calling number is acquired through receipt of a message from the calling party (step D3). The calling party information control means 104 checks the thus-acquired calling number against a phone number distribution condition (step D4). If the calling number is a connectable number, the incoming call monitoring means 106 is activated (step D5), and an available operator terminal is searched (step D6). If an operator terminal is available, the connection processing means 115 is activated (step D9). If no operator terminal is available, the call is placed at the head of the queue section 210 (step D7), and a no-continuous-processing flag is set (step D8).

In contrast, if the calling number cannot be identified in step D3, the calling party information control means 104 retrieves another callback condition (step D10). If another callback condition exists, a continued processing flag is set (step D11), and the processing is completed. In contrast, if no other callback condition exists, the callback registration means 107 is activated (step D12), and abortion of continued processing is set (step D8). The flag is cleared, and the processing is completed.

Figure 29:
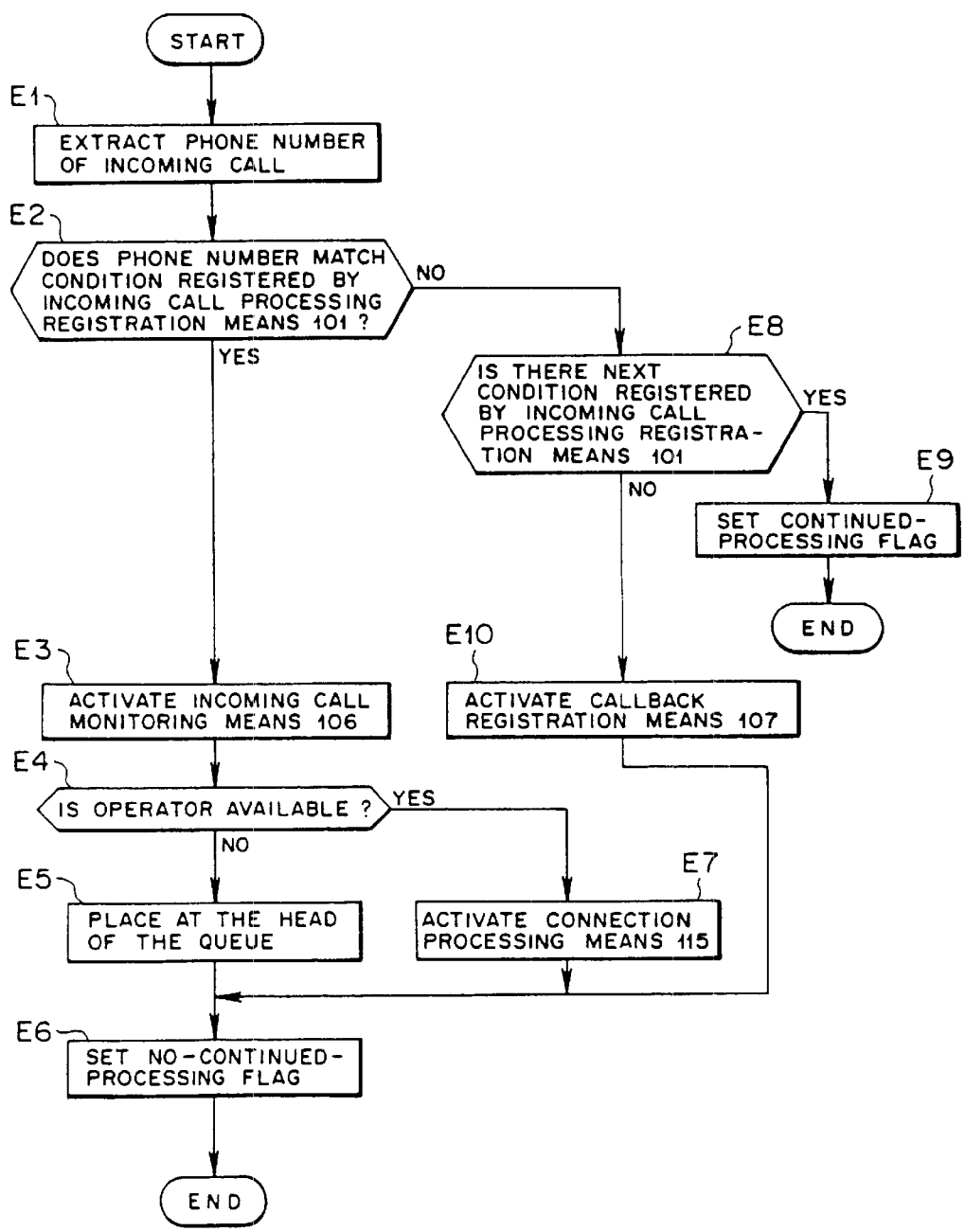
FIG. 29 is a flowchart for describing the function of incoming call control means.

FIG. 29 shows a flowchart for the incoming call information control means 105. In step E1 shown in FIG. 29, the incoming call information control means 105 extracts the phone number of the incoming call. The thus-extracted phone number is checked against the phone number distribution condition (step E2). If the phone number is a connectable number, the incoming call monitoring means 106 is activated (step E3), and an available operator terminal is searched (step E4). If an operator terminal is available, the connection processing means 115 is activated (step E7). If no operator terminal is available, the call is placed at the head of the queue section 210 (step E5), and a no-continued-processing flag is set (step E6). In contrast, if the extracted phone number does not match the distribution condition in step E2, the incoming call information control means 105 retrieves another callback condition (step E9), and the processing is completed. If no other callback condition exists, the callback registration means 107 is activated (step E10), and abortion of continued processing is set (step E6). The flag is cleared, and the processing is completed.

As mentioned above, the incoming call can be processed according to each situation by changing of the callback condition.

Further, although in the previous embodiment the client terminal of the calling party is handled as a telephone, it goes without saying that another terminal 17b can originate a call. The present invention can also be applied to transmission of data other than sound data. In such a case, another terminal corresponds to, e.g., a personal computer or a portable information device connected to the public switched network by way of a modem. Further, the public switched network 17 may correspond to an analog network; the public switched network 17' may correspond to a digital network; the terminal 17' *a* may correspond to a telephone; and the terminal 17'*b* may correspond to another terminal.

In the incoming call processing apparatus 11*b* according to the present embodiment, functions corresponding to all of the call receiving means, the incoming call acceptance means, and the answer means are implemented by calling up a program on unillustrated RAM from a recording medium, such as a disk unit or CD-ROM (not shown), and by activation of a CPU (not shown) according to the program.

The call receiving means causes the electronic exchanger 11 to receive an incoming call. The incoming call acceptance means determines whether to answer the incoming call immediately or to answer the incoming call at a later time at which the volume of incoming call traffic intensity is light. Further, the answer means answers the incoming call according to the type of answer determined by the incoming call acceptance means. So long as there is executed a program in which steps constituting these means are described, a computer may effect functions corresponding to these means.

The program is usually recorded on CD-ROM or the like and is used after being installed on the disk unit of the computer from the CD-ROM or the like.

More specifically, the disk unit or CD-ROM corresponds to the storage medium having the program stored therein.

A program coding method may be freely modified.

Specifically, when subroutines of each flowchart are coded, one subroutine may be branched to two or more functions. Conversely, two or more subroutines may be processed in the form of a single function.

Even if the flowcharts that are described in detail in the previous embodiment are changed by means of an increase or decrease in arguments of the function, an increase or decrease in the range of choice of a conditional branch, or insertion of a function into another function, the present invention can be worked, so long as the flowcharts fall within the scope of the present invention.

What is claimed is:

1. An incoming call processing method at an incoming call processing apparatus having a queue for storing an incoming call corresponding to a callback condition from an operator terminal of an incoming call acceptance side terminal to a client terminal of a calling party, comprising:

a call receiving step for causing an electronic exchanger, in said incoming call processing apparatus, to receive an incoming call;

an incoming call acceptance step for determining whether to answer each of the incoming call and the calls stored in the queue in the call receiving step based on a first callback condition of the incoming call acceptance side, said first callback condition being changeable by the calling party, and said first callback condition using a table for storing a phone number of said client terminal, a callback time prepared on the basis of past experience of traffic intensity and a phone number of said operator terminal in sequence of arrival of the incoming calls, or a second callback condition, said second callback condition being selected with the predicted traffic intensity information prepared on the basis of a past experience such as data corresponding to the number of incoming calls per hour in a particular day, the number of incoming calls per weekday, the number of incoming calls per month, and the number of incoming calls per event, immediately to answer the incoming call or to call back the incoming call at a later time at which the volume of incoming traffic intensity is light; and an answer step for immediately answering the incoming call from the incoming call acceptance side terminal to the calling party, while calling back the incoming call at the later time at which the volume of incoming traffic intensity is light, based on the type of answer determined in the incoming call acceptance step.

2. The incoming call processing method as defined in claim 1, further comprising a time information selection-and-determination step for selecting and determining information about the time at which an operator can answer the incoming call that in the incoming call acceptance step is selected to be answered at a later time;

a first notification step for reporting to a calling party the time information selected and determined in the time information selection-and-determination step;

a verification step for verifying an approval of the calling party regarding the time information report made in the first notification step; and an answer time determination step for determining as answer time information the time information approved by the calling party in the verification step.

3. The incoming call processing method as defined in claim 2, wherein, the time information selection-and-determination step is configured by a step for selecting and determining the time at which the operator can answer the incoming call selected in the incoming call acceptance step to be answered at a later time.

4. The incoming call processing method as defined in claim 2, wherein the time information selection-and-determination step is configured by a step for selecting and determining the time zone at which the operator can answer the incoming call selected in the incoming call acceptance step to be answered at a later time;

the first notification step is followed by an answer time designation step, in which the calling party designates a desired time within the answer time zone determined in the time information selection-and-determination step; and the verification step is configured by a step for verifying the time designated in the answer time designation step.

5. The incoming call processing method as defined in claim 2, further comprising:

an operator terminal selection step for selecting an operator terminal which is to answer, at the answer time determined in the response time determination step, the incoming call, which in the incoming call acceptance step has been selected to be answered at a later time; and an operator terminal reserve step for reserving the operator terminal selected in the operator terminal selection step for answering the incoming call.

6. The incoming call processing method as defined in claim 1, further comprising:

an answer postponement information cancellation step for canceling the answer postponement information on condition that the operator terminal can answer and finish talking if the same calling party makes an incoming call before the operator answers the incoming call that has been selected in the incoming call acceptance step to be answered at a later time.

7. The incoming call processing method as defined in claim 1, further comprising:

a second notification step for informing the calling party that no operator terminal can answer if the same calling party makes an incoming call in the answer step before the operator answers the incoming call which in the incoming call acceptance step has been selected to be answered at a later time.

8. The incoming call processing method as defined in claim 7, further comprising:

an answer time change step for changing the answer time which has been determined in the answer time determination step, in association with the informing operation in the second notification step.

9. An incoming call processing apparatus, at an incoming call processing apparatus having a queue for storing an incoming call corresponding to a callback condition from an operator terminal of an incoming call acceptance side terminal to a client terminal of a calling party, comprising:

predicted traffic intensity information storage means for storing a second callback condition being changeable by a setting of the calling party or predicted traffic intensity information, said predicted traffic intensity information being prepared on the basis of a past experience such as data corresponding to the number of incoming calls per hour in a particular day, the number of incoming calls per weekday, the number of incoming calls per month, and the number of incoming calls per event, incoming call acceptance means for determining whether to answer each of the incoming call and the calls stored in the queue based on a first callback condition of the incoming call acceptance side, said first callback condition being changeable by a calling party, and said first callback condition using a table for storing a phone number of said client terminal, a callback time prepared on the basis of past experience of traffic intensity and a phone number of said operator terminal in sequence of arrival of the incoming calls, immediately or predicted traffic intensity information, said predicted traffic intensity information being prepared on the basis of a past experience such as data corresponding to the number of incoming calls per hour in a particular day, the number of incoming calls per weekday, the number of incoming calls per month, and the number of incoming calls per event, or to call back the incoming call at a later time at which the volume of incoming traffic intensity is light;

time information selection-and-determination means for selecting and determining information about the time at which the operator can answer the incoming call that has been selected by the incoming call acceptance means to be answered at a later time, on the basis of the predicted traffic intensity information stored in the predicted traffic intensity information storage means;

first notification means for reporting to a calling party the time information selected and determined by the time information selection-and-determination means;

verification means for verifying an approval of the calling party regarding the time information report made by the first notification means;

answer time storage means for determining and storing as answer time information the time information that is approved by the calling party by way of the verification means; and answer means which immediately answers the incoming call if the incoming call acceptance means has determined that the incoming call is to be answered immediately from the incoming call acceptance side terminal to the calling party, and which calls back the incoming call at the time stored in the answer time storage means if the incoming call acceptance means has determined that the incoming call is to be answered at a later time.

10. The incoming call processing apparatus as defined in claim 9, further comprising:

operator terminal selection means for selecting an operator terminal which is to answer the incoming call which has been selected by the incoming call acceptance means to be answered at a later time, at the answer time determined by the incoming call acceptance means; and operator terminal reservation means for reserving the operator terminal selected by the operator terminal selection means for answering the incoming call.

11. The incoming call processing apparatus as defined in claim 9, further comprising:

answer postponement information cancellation means for canceling the answer postponement information on condition that the operator terminal can answer and finish talking if the same calling party makes another incoming call before the operator answers the incoming call that has been selected by the incoming call acceptance means to be answered at a later time;

second notification means for informing the calling party that no operator terminal can answer if the same calling party makes an incoming call before the operator answers the incoming call which has been selected by the incoming call acceptance means to be answered at a later time; and answer time change means capable of changing the answer time which has been determined by the answer time determination means in association with the reporting operation of the second notification means.

12. A computer-readable recording medium on which there is recorded an incoming call processing program for causing a computer to act as call receiving means for causing an electronic exchanger in an incoming call processing apparatus, said incoming call processing apparatus having a queue for storing an incoming call corresponding to a callback condition from an operator terminal of an incoming call acceptance side terminal to a client terminal of a calling party, to receive an incoming call;

incoming call acceptance means for determining whether to answer each of the incoming call and the calls stored in the queue received by the call receiving means based on a first callback condition of the incoming call acceptance side, said first callback condition being changeable by the calling party, and said first callback condition using a table for storing a phone number of said client terminal, a callback time prepared on the basis of past experience of traffic intensity and a phone number of said operator terminal in sequence of arrival of the incoming calls, or a second callback condition, said second callback condition being selected with the predicted traffic intensity information prepared on the basis of a past experience such as data corresponds to the number of incoming calls per hour in a particular day, the number of incoming calls per hour in a particular day, the number of incoming calls per weekday, the number of incoming calls per month, and the number of incoming calls per event, immediately to answer the incoming call or to call back the incoming call at a later time at which the volume of incoming traffic intensity is light; and answer means for immediately answering the incoming call from the incoming call acceptance side terminal to the calling party, while calling back the incoming call at the later time at which the volume of incoming traffic intensity is light, based on the type of answer determined by the incoming call acceptance means.

* * * * *